(12) United States Patent
Sakuma

(10) Patent No.: US 11,450,957 B2
(45) Date of Patent: Sep. 20, 2022

(54) WIRELESS COMMUNICATION DEVICE

(71) Applicant: Fujikura Ltd., Tokyo (JP)

(72) Inventor: Ken Sakuma, Sakura (JP)

(73) Assignee: FUJIKURA LTD., Tokyo (JP)

( * ) Notice: Subject to any disclaimer, the term of this patent is extended or adjusted under 35 U.S.C. 154(b) by 256 days.

(21) Appl. No.: 16/864,312

(22) Filed: May 1, 2020

(65) Prior Publication Data

US 2021/0344113 A1    Nov. 4, 2021

(51) Int. Cl.
*H01Q 3/36*        (2006.01)
*H04W 16/28*       (2009.01)

(52) U.S. Cl.
CPC .............. *H01Q 3/36* (2013.01); *H04W 16/28* (2013.01)

(58) Field of Classification Search
CPC ................................ H01Q 3/36; H04W 16/28
USPC ........................................................ 342/372
See application file for complete search history.

(56) References Cited

U.S. PATENT DOCUMENTS

| | | | |
|---|---|---|---|
| 9,318,805 B2 * | 4/2016 | Jia ......................... | H04B 17/318 |
| 10,009,895 B2 | 6/2018 | Nishikawa et al. | |
| 10,218,069 B2 * | 2/2019 | Gomadam ............... | H01Q 3/34 |
| 11,101,862 B2 | 8/2021 | Venugopal et al. | |
| 2004/0114535 A1 | 6/2004 | Hoffmann et al. | |
| 2009/0298509 A1 | 12/2009 | Hoshino et al. | |
| 2011/0026418 A1 | 2/2011 | Bollea et al. | |
| 2016/0323755 A1 | 11/2016 | Cordeiro et al. | |
| 2016/0359230 A1 | 12/2016 | Wang et al. | |
| 2017/0142605 A1 * | 5/2017 | Cheng .................. | H04B 7/0617 |
| 2017/0366242 A1 | 12/2017 | Lee et al. | |

FOREIGN PATENT DOCUMENTS

| | | | | |
|---|---|---|---|---|
| CA | 3041457 A1 * | 1/2018 | ............. | G01S 11/10 |
| CN | 105785328 B * | 7/2018 | | |
| WO | WO-2013133742 A1 * | 9/2013 | ............. | H04B 7/024 |
| WO | WO-2018048543 A1 * | 3/2018 | ............. | G01S 11/10 |
| WO | WO-2021254607 A1 * | 12/2021 | ............. | H04B 7/024 |

OTHER PUBLICATIONS

U.S. Appl. No. 16/864,239, Ken Sakuma, filed May 1, 2020.
Non-Final Office Action dated Feb. 10, 2022, issued in U.S. Appl. No. 16/864,239 (18 pages).
Sur, Sanjib et al., "WiFi-Assisted 60 GHz Wireless Networks", MobiCom'17, Oct. 2017; Cited in U.S. Office Action dated Feb. 10, 2022, issued in counterpart U.S. Appl. No. 16/864,239. (14 pages).
Bertrand, Thibault, "Hybrid beamforming at 60GHz", Ecole polytechnique de Louvain, Universite catholique de Louvain, downloadable at http ://hdl. handle. net/2078 .1 /thesis: 19404, 2019; Cited in U.S. Office Action dated Feb. 10, 2022, issued in counterpart U.S. Appl. No. 16/864,239. (89 pages).

* cited by examiner

*Primary Examiner* — Harry K Liu
(74) *Attorney, Agent, or Firm* — WHDA, LLP

(57) ABSTRACT

A wireless communication device includes, a beamforming antenna, a storage that stores a plurality of optimized beam tables in which a peak direction of an array factor corresponding to each antenna weight vector are non-uniformly distributed in an angular space, the respective plurality of optimized beam tables is optimized in different directions, and a beamformer that sets a beam pattern of the beamforming antenna based on an antenna weight vector constituting one optimized beam table selected from the plurality of optimized beam tables.

20 Claims, 27 Drawing Sheets

PRIOR ART

WIRELESS COMMUNICATION DEVICE

BACKGROUND OF THE INVENTION

Field of the Invention

The present invention relates to a wireless communication device including a beamforming antenna.

Description of the Related Art

In order to increase wireless communication capacity, a frequency band to be used has been widened and increased in frequency. For example, the millimeter-wave band (frequency band where the frequency is 30 GHz or more and 300 GHz or less) is defined as an extremely high frequency (EHF) in the International Telecommunication Union (ITU), and the development of a wireless communication device using the band is rapidly progressing. Among them, the 60 GHz band that overlaps the oxygen absorption band has a large transmission loss (as a result, the transmission distance is short), and is therefore determined as a license-free frequency band for short-range communication in many countries. For this reason, for example, in a small cell linked with a mobile communication network or a wireless access network of a wireless Internet service provider, or a wireless backhaul link for a wireless base station, a wireless relay station, or a public wireless LAN communication access point, the use of the 60 GHz band has been studied. In these applications, it is expected to realize a communication capacity of several Gbps between wireless communication devices separated by several tens of meters to several hundreds of meters.

In a wireless communication device using a millimeter-wave band, a beam antenna having high gain and sharp directivity is usually used. In particular, in a wireless communication device that is assumed to communicate with an opposite communication device which is a mobile terminal or to perform Point to MultiPoint (P2MP) communication with a plurality of opposite communication devices, a beamforming antenna capable of controlling a beam pattern is used. In a wireless communication device provided with a beamforming antenna, a configuration is employed in which a beam pattern of a beamforming antenna is changed depending on a direction in which an opposite communication device is provided. A wireless communication device according to IEEE 802.11ad is an example of a wireless communication device in which such a configuration is employed.

The beamforming antenna is constituted by a plurality of antenna elements. At the time of transmission, the transmission signal divided by the splitter is input to each antenna element after the amplitude and phase are adjusted at the amplitude adjuster and the variable phase shifter. At the time of reception, the received signals output from each antenna element are combined by the power combiner after the phase and the amplitude are adjusted at the variable phase shifter and the amplitude adjuster. A wireless communication device including the beamforming antenna controls the beam pattern of the beamforming antenna by controlling the gain of the amplitude adjuster and the phase shift amount of the variable phase shifter corresponding to each antenna element.

A wireless communication device including a beamforming antenna has a beam table constituted by a plurality of antenna weight vectors. Here, the antenna weight vector refers to a vector representing the gain of the amplitude adjuster and the phase shift amount of the variable phase shifter corresponding to each antenna element. When the beamforming antenna is constituted by antenna elements of n, the antenna weight vector is given by, for example, an n-dimensional complex vector or a 2n-dimensional real vector.

A wireless communication device including a beamforming antenna sets the gain of the amplitude adjuster and the phase shift amount of the variable phase shifter by referring to the antenna weight vector selected from the beam table. If the antenna weight vector selected from the beam table is changed from the first antenna weight vector to the second antenna weight vector, the beam pattern of the beamforming antenna is changed from the first beam pattern corresponding to the first antenna weight vector to the second beam pattern corresponding to the second antenna weight vector.

The beam pattern of the beamforming antenna calculated from only the antenna weight vector is referred to an array factor. The beam pattern of the beamforming antenna is calculated by multiplying the array factor and the beam pattern of the antenna element.

U.S. Pat. No. 9,318,805 discloses a technique for updating a beam table. This technique can be applied to a wireless communication device conforming to IEEE 802.11ad.

In a conventional wireless communication device, a beam table is used in which each peak direction of an array factor corresponding to each antenna weight vector is uniformly distributed (aligned at equal intervals) in the angular space (hereinafter, referred to as "standard beam table"). For this reason, the direction exists in which the significant drop of gain cannot be avoided even if the beam pattern of the beamforming antenna is set to the beam pattern corresponding to any antenna weight vector. Therefore, in the wireless communication with an opposite communication device existing in such a direction, wireless signal quality can easily be deteriorated.

As one example, a standard beam table is considered that is constituted by fifteen sets of antenna weight vectors and were designed according to the following guidelines.

(1) A beamforming antenna is assumed in which sixteen antenna elements (assuming a planar patch antenna) equally spaced on a same straight line (assuming arrangement by the ½ wavelength intervals) on the same plane.

(2) As the direction orthogonal to the plane is the 90° direction, fifteen target directions are uniformly distributed in the direction from the 30° direction to the 150° direction.

(3) As the antenna weight vector set corresponding to each target direction, an antenna weight vector set is selected such that the gain of the array factor in the target direction is the maximum among the antenna weight vector sets in which the peak direction of the array factor coincides with the target direction with a predetermined accuracy.

FIG. 51 exemplary shows a graph (shown by the polar coordinate) showing an array factor corresponding to each antenna weight vector set constituting the standard beam table designed as described above.

FIG. 52 is a graph showing an envelope of the array factor shown in FIG. 51 (shown by the orthogonal coordinate with a vertical axis representing gain and a horizontal axis representing direction). FIG. 53 is a graph in which the valleys of the array factor shown in FIG. 52 (minimum points of the envelope shown in FIG. 52) are picked up and plotted (shown by the orthogonal coordinate with a vertical axis representing gain and a horizontal axis representing direction).

According to the graph shown in FIG. 52, it is found that the valley of the array factor, that is, the direction exists in which the drop of gain cannot be avoided even if the beam pattern of the beamforming antenna is set to the beam pattern corresponding to any antenna weight vector set. In addition, according to the graph shown in FIG. 53, the drop in gain in the valley of the array factor reaches near 3 dB in the vicinity of the 90° direction.

In view of the above, it can be found that the direction exists in which the significant drop of gain cannot be avoided even if the beam pattern of the beamforming antenna is set to the beam pattern corresponding to any antenna weight vector set in the vicinity of the 90° direction.

When the opposite communication device is a mobile terminal, even if the direction exists in which the significant drop of gain cannot be avoided, the opposite communication device is unlikely to suffer a serious disadvantage. This is because there is a low possibility that the opposite communication device will continue to exist in that direction. On the other hand, when the opposite communication device is a fixed terminal, if the direction exists in which the significant drop of gain cannot be avoided, there is a high possibility that the opposite communication device suffers a serious disadvantage. This is because there is a high possibility that an opposite communication device once installed in the direction will continue to exist in that direction. As for the disadvantage for the opposite communication device, the decrease of the communication speed along with the decrease in wireless signal quality which may occur in a wireless communication device that switches a Modulation and Coding Scheme (MCS) depending on the wireless signal quality is considered as an example.

SUMMARY OF THE INVENTION

An aspect of the present invention has been made in view of the above-described circumstances, and is to realize a wireless communication device in which deterioration of wireless signal quality is not easily occurred in a wireless communication with an opposite communication device existing in the direction in which the significant drop of gain cannot be avoided as long as a standard beam table is used.

A wireless communication device according to an aspect of the present invention includes, a beamforming antenna, a storage that stores a plurality of optimized beam tables in which a peak direction of an array factor corresponding to each antenna weight vector set are non-uniformly distributed in an angular space, the respective plurality of optimized beam tables is optimized in different directions, and a beamformer that sets a beam pattern of the beamforming antenna based on an antenna weight vector set constituting one optimized beam table selected from the plurality of optimized beam tables.

According to an aspect of the present invention, by using the optimized beam table, a wireless communication device can be realized, in which deterioration of wireless signal quality is not easily occurred in a wireless communication with an opposite communication device existing in the direction in which the significant drop of gain cannot be avoided as long as a standard beam table is used.

DETAILED DESCRIPTION OF THE PREFERRED EMBODIMENTS (Wireless Communication System)

Figure 1:
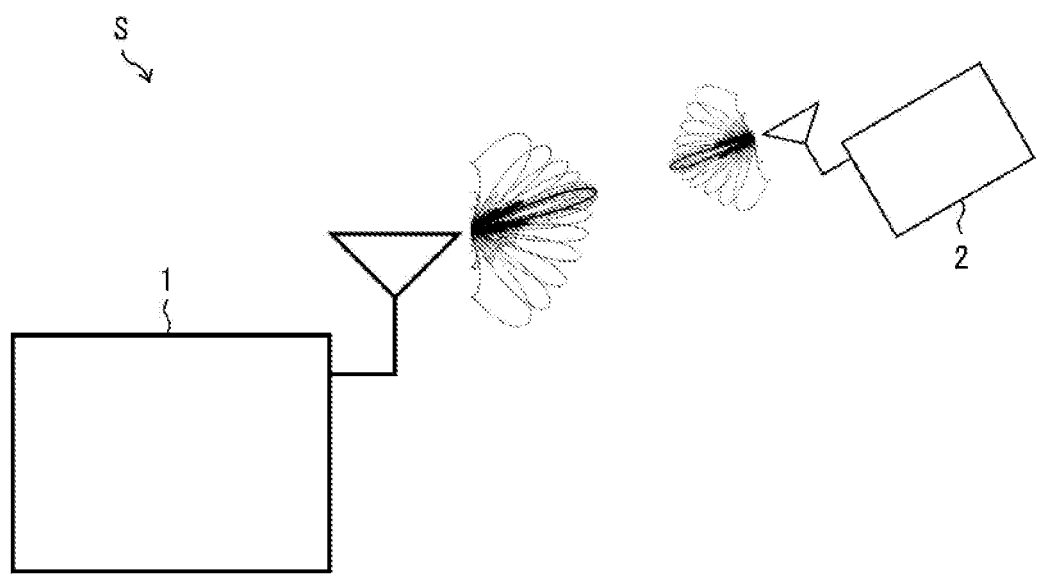
FIG. 1 is a diagram showing a configuration of a wireless communication system according to one embodiment of the present invention.

The configuration of the wireless communication system S according to the present embodiment will be described with reference to FIG. 1. FIG. 1 is a diagram showing a configuration of the wireless communication system S.

As shown in FIG. 1, the wireless communication system S includes a first wireless communication device 1 (an example of "wireless communication device" in the claims) and a second wireless communication device 2 (an example of "opposite communication device" in the claims).

The first wireless communication device 1 is a wireless communication device connected to the upstream network. As an example, the first wireless communication device 1 is a wireless communication device managed by a wireless Internet service provider. In this case, the first wireless communication device 1 is connected to the Internet (an example of an upstream network) via a provider network, for example. An optical fiber line or a wireless communication line is used for connection between the first wireless communication device 1 and the provider network, for example.

The second wireless communication device 2 is a wireless communication device connected to the downstream network. As an example, the second wireless communication device 2 is a wireless communication device managed by a user who has a contract with a service provider. In this case, the second wireless communication device 2 is connected to, for example, a local area network (an example of a downstream network) in the user's home.

In addition, in FIG. 1, although the configuration that has one second wireless communication device 2 is shown, it is not limited to this. For example, a configuration in which there are two or more second wireless communication devices 2 may be employed. In this case, each of the two or more second wireless communication devices 2 performs wireless communication with one first wireless communication device 1.

Each of the first wireless communication device 1 and the second wireless communication device 2 includes a beamforming antenna. The first wireless communication device 1 specifies the direction in which the second wireless communication device 2 is located in the beamforming process, and selects a beam pattern corresponding to the specified direction as the beam pattern of the beamforming antenna included in the first wireless communication device 1. Similarly, the second wireless communication device 2 specifies the direction in which the first wireless communication device 1 exists in the process of performing beamforming, and selects a beam pattern corresponding to the specified direction as the beam pattern of the beamforming antenna included in the second wireless communication device 2. Thereafter, the first wireless communication device 1 and the second wireless communication device 2 each perform the wireless communication according to a Modulation and Coding Scheme (MCS) corresponding to the wireless signal quality. For example, a high-speed wireless communication is performed when the wireless signal quality is good, and a low-speed wireless communication is performed when the wireless signal quality is poor.

The wireless communication system S according to the present embodiment is characterized by a beam pattern that can be selected by the first wireless communication device 1 as a beam pattern of a beamforming antenna used for the wireless communication with the second wireless communication device 2. The beam pattern that can be selected by the first wireless communication device 1 as the beam pattern of the beamforming antenna used for wireless communication with the second wireless communication device 2 will be described later with reference to different drawings.

The first wireless communication device 1 is not limited to a wireless communication device installed by a service provider. Similarly, the second wireless communication device 2 is not limited to a wireless communication device installed by a user who has a contract with a service provider. For example, the first wireless communication device 1 and the second wireless communication device 2 may be wireless communication devices installed by organizations such as companies and public institutions.

(Configuration of First Wireless Communication Device)

Figure 2:
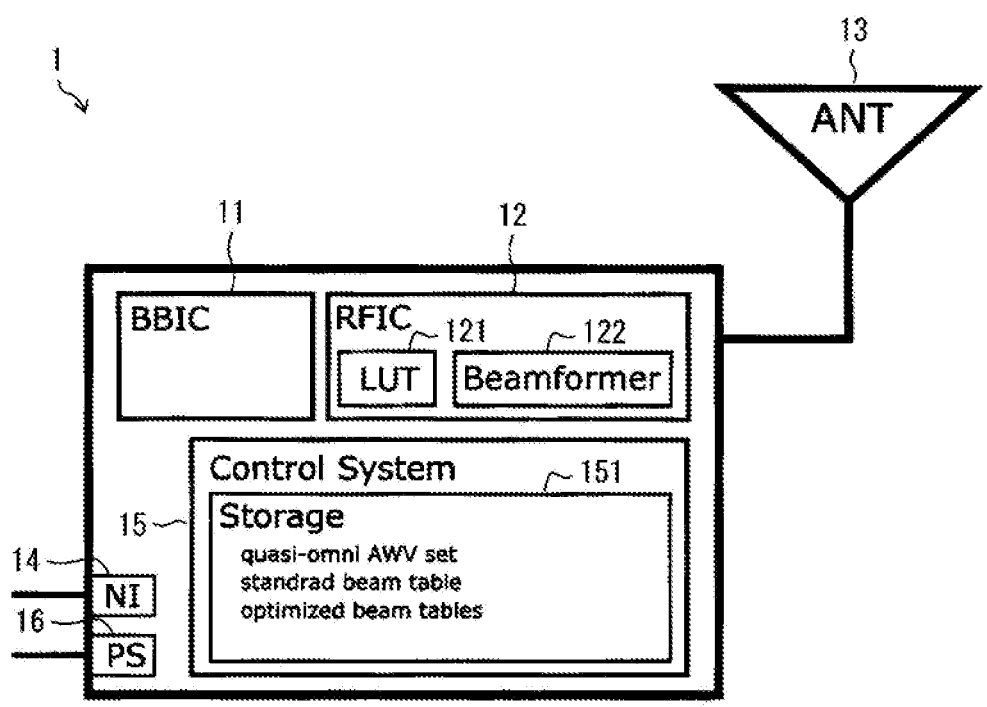
FIG. 2 is a block diagram showing a configuration of a first wireless communication device provided in the wireless communication system shown in FIG. 1.

A configuration of the first wireless communication device 1 included in the wireless communication system S will be described with reference to FIG. 2. FIG. 2 is a block diagram showing a configuration of the first wireless communication device 1.

As shown in FIG. 2, the first wireless communication device 1 includes a baseband integrated circuit (BBIC) 11, a radio frequency integrated circuit (RFIC) 12, a beamforming antenna 13, a network interface 14, a control system 15, and a power supply unit 16.

The BBIC 11 is an integrated circuit that processes a baseband (BB) signal. The RFIC 12 is an integrated circuit that processes a radio frequency (RF) signal. The beamforming antenna 13 is an antenna capable of setting a beam pattern depending on an antenna weight vector, and is used for wireless communication with the second wireless communication device 2. In the present embodiment, a phased array antenna constituted by a plurality of antenna elements is used as the beamforming antenna 13. The network interface 14 is an interface for connecting the wireless communication device 1 to the upstream network. The control system 15 mediates the communication between the upstream network connected to the first wireless communication device 1 and the downstream network connected to the second wireless communication device 2 by controlling the BBIC 11 and the RFIC 12. The control system 15 executes control of the BBIC 11 and the RFIC 12 by referring to various databases according to a provided program. The power supply unit 16 supplies power obtained from the outside to each unit of the first wireless communication device 1.

The RFIC 12 includes a look-up table (LUT) 121 and a beam former 122. An antenna weight vector transferred from the storage 151 described later is stored in the LUT 121. The beam former 122 sets the beam pattern of the beamforming antenna 13 according to the antenna weight vector stored in the LUT 121. The beam former 122 is constituted by, for example, an amplitude adjuster in which a gain is set according to an antenna weight vector and a variable phase shifter device in which a phase shift amount is set.

The control system 15 includes a storage 151. The storage 151 stores a plurality of antenna weight vectors. As the storage 151, for example, a storage medium such as a hard disk drive (HDD), a solid state drive (SSD), or a flash memory can be used. In addition, a non-volatile storage area built in an Application Specific Integrated Circuit (ASIC) or a System-on-a-Chip (SoC) functioning as the control system 15 may be used as the storage 151. The control system 15 selects one antenna weight vector set from a plurality of antenna weight vector sets stored in the storage 151, and transfers the selected antenna weight vector set to the LUT 121 described above.

In the following description, the beam pattern corresponding to a certain antenna weight vector set refers to a beam pattern of the beamforming antenna 13 obtained when the gain of the amplitude adjuster and the phase shift amount of the variable phase shifter constituting the beam former 122 are set depending on the antenna weight vector set. An array factor corresponding to an antenna weight vector set refers to a beam pattern corresponding to the antenna weight vector set when each antenna element being non-directional. A beam pattern corresponding to an antenna weight vector is calculated by multiplying the array factor corresponding to the antenna weight vector set and the beam pattern of each antenna element.

(Antenna Weight Vector Sets Stored in Storage)

The storage 151 included in the first wireless communication device 1 includes at least one quasi-omni antenna weight vector set, at least one standard beam table (SBT), and an optimized beam table group constituted by a plurality of optimized beam tables OBT ($\theta 1$), OBT ($\theta 2$), . . . , and OBT ($\theta N$). Here, N is an arbitrary natural number of 2 or more.

The standard beam table SBT and the optimized beam table OBT ($\theta k$) are tables (data arrays) each including a plurality of antenna weight vector sets. Here, k is an arbitrary natural number of 1 or more and N or less. Hereinbelow, a quasi-omni antenna weight vector set, a standard beam table (SBT), and an optimized beam table group constituted by a plurality of optimized beam tables OBT ($\theta 1$), OBT ($\theta 2$), . . . , and OBT ($\theta N$) are described in this order.

(1) Quasi-Omni Directional Antenna Weight Vector Set

As the quasi-omni directional antenna weight vector set, an antenna weight vector set corresponding to a beam pattern having approximately uniform gain over a wide angular range or having a gain equal to or higher than a certain reference is used. The quasi-omni directional antenna weight vector set is appropriately used, for example, in the wireless communication device 1 in accordance with IEEE 802.11ad.

(2) Standard Beam Table

The standard beam table SBT is a table (data array) constituted by a plurality of antenna weight vector set-. The peak direction of the array factor corresponding to each antenna weight vector set constituting the standard beam table SBT is uniformly distributed in the angular space (arranged at equal intervals).

The first wireless communication device 1 uses such a standard beam table SBT when the direction in which the second wireless communication device 2 exists is not specified. For example, the wireless communication device 1 in accordance with IEEE 802.11ad uses such a standard beam table SBT in a sector-level sweep SLS) phase or a beam refinement protocol (BRP) phase performed in a state where the direction in which the second wireless communication device 2 exists is not specified. At this time, the control system 15 transfers the antenna weight vector set constituting the standard beam table SBT stored in the storage 151 to the LUT 121 of the RFIC 12. Then, the beam former 122 of the RFIC 12 sequentially sets the beam pattern of the beamforming antenna 13 according to the antenna weight vector set transferred to the LUT 121 of the RFIC 12.

(3) Optimized Beam-Table Group

Each optimized beam table OBT ($\theta k$) belonging to the optimized beam table group is a table (data array) constituted by a plurality of antenna weight vector sets. The peak direction of the array factor corresponding to each antenna weight vector set constituting the optimized beam table OBT ($\theta k$) is non-uniformly distributed in the angular space (not arranged at equal intervals).

The plurality of optimized beam tables OBT ($\theta 1$), OBT ($\theta 2$), . . . , and OBT ($\theta_N$) belonging to the optimized beam table group are optimized for different specific directions. For example, the first optimized beam table OBT ($\theta 1$) is optimized in the $\theta 1$ direction, and the second optimized beam table OBT (θ2) is optimized in the θ2 direction. The peak direction of the array factor corresponding to each antenna weight vector set constituting each optimized beam table OBT (θk) is distributed so as to be the densest in a specific direction (θk direction) and to be gradually sparser as the distance from the direction increases. The optimized beam table OBT may be optimized with respect to two or more directions. In such a case, the peak direction of the array factor corresponding to each antenna weight vector set constituting the optimized beam table OBT is distributed so as to be the densest in each of the two or more directions and to be gradually sparser as the distance from the two or more directions increases. Here, the description "the peak direction in a certain direction being the densest" means a state of the difference between two peak directions adjacent to each other in the angular space being minimum in the direction. The description "the peak direction becoming gradually sparser in the angular space" means a state of gradually increasing the difference between two peak directions adjacent to each other in the angular space.

When the direction in which the second wireless communication device 2 is located is specified, the first wireless communication device 1 selects and uses the optimized beam table OBT (θk) optimized for the direction closest to the direction in which the second wireless communication device 2 exists from a plurality of optimized beam tables OBT (θ1), OBT (θ2), . . . , OBT (θ$_N$). For example, the wireless communication device 1 in accordance with IEEE 802.11 ad uses such an optimized beam table OBT (θk) in a sector-level sweep (SLS) phase or a beam refinement protocol (BRP) phase performed after the direction is specified in which the second wireless communication device 2 exists. At this time, the control system 15 transfers the antenna weight vector set constituting the selected optimized beam table OBT (θk) to the LUT 121 of the RFIC 12 from the storage 151. The beam former 122 of the RFIC 12 sets the beam pattern of the beamforming antenna 13 depending on the antenna weight vector set transferred to the LUT 121 of the RFIC 12.

When the direction in which the second wireless communication device 2 exists is specified, the first wireless communication device 1 preferably stores the specified direction in the storage 151. Alternatively, the first wireless communication device 1 preferably transmits the specified direction to the server in order to store the specified direction in the server. By employing such a configuration, after the power is on, after a hardware is reset, after a software is reset, or the like, a configuration in which the process of specifying the direction in which the second wireless communication device 2 exists using the standard beam table STB can be omitted. In this case, the first wireless communication device 1 selects the optimized beam table OBT (θk) optimized in the direction θk closest to the direction stored in the storage 151 or the server. When such a configuration is employed, it is preferable that the angular range covered by each optimized beam table OBT (θk) matches the angular range covered by the standard beam table SBT. Accordingly, when the second wireless communication device 2 exists in a direction different from the direction stored in the storage 151 or the server, possibilities can be reduced such that it is difficult to establish a communication line with the second wireless communication device 2. A non-volatile storage medium other than the storage 151 may be used as a storage for the direction in which the second wireless communication device 2 exists. The non-volatile storage medium may be a non-volatile storage area built in a chip such as an ASIC or a SoC.

Further, the second wireless communication device 2 may have the same configuration as the first wireless communication device 1. When the second wireless communication device 2 stores the direction in which the first wireless communication device 1 exists, the second wireless communication device 2 preferably stores in the storage 151 an identifier of the first wireless communication device 1 in association with the direction (direction in which the first wireless communication device 1 exists). Alternatively, the second wireless communication device 2 preferably transmits the identifier of the first wireless communication device 1 to the server in order to store the identifier to the server in association with the direction (direction in which the first wireless communication device 1 exists).

In this case, the identifier obtained from the first wireless communication device 1 which is the current opposite communication device is compared with the identifier stored in the storage 151 or the server. Only when they match, a configuration can be employed, in which the process of specifying the direction of the first wireless communication device 1 using the standard beam table STB is omitted. That is, if the communication has not yet been performed with the first wireless communication device 1 that is the current opposite communication device, the process of specifying the direction in which the first wireless communication device 1 exists using the standard beam table SBT is performed. If the communication has already been performed with the first wireless communication device 1 that is the current opposite communication device, the process of specifying the direction in which the first wireless communication device 1 exists using the standard beam table SBT can be omitted. As the identifier of the first wireless communication device 1, for example, the BSSID of the first wireless communication device 1 may be used. A non-volatile storage medium other than the storage 151 may be used as a storage for the direction in which the first wireless communication device 1 exists. The non-volatile storage medium may be a non-volatile storage area built in a chip such as an ASIC or a SoC.

(Method for Selecting Optimized Beam Table According to Number of Second Wireless Communication Devices)

When a plurality of optimized beam tables OBT (θ1), OBT (θ2), . . . , OBT (θN) each optimized for one direction are stored in the storage 151, the first wireless communication device 1 preferably selects a beam table used for wireless communication with the second wireless communication device 2 as follows.

First, the first wireless communication device 1 specifies the number of second wireless communication devices 2. When the number of the second wireless communication devices 2 is one, the first wireless communication device 1 specifies the direction θ in which the second wireless communication device 2 exists using the standard beam table SBT. Then, the first wireless communication device 1 selects the optimized beam table OBT (θk) where |θk−θ| is the minimum from the optimized beam tables OBT (θ1), OBT (θ2), . . . , OBT (θ$_N$) as a beam table used for wireless communication with the second wireless communication device 2. As a result, it is possible to reduce the decrease in wireless signal quality that may occur when the second wireless communication device 2 is located at a valley of the array factor.

In addition, when a plurality of optimized beam tables OBT (θ1), OBT (θ2), . . . , OBT (θN) each optimized for one direction and a plurality of optimized beam tables OBT (θ1a, θ1b), OBT (θ2a, θ2b), . . . , OBT (θMa, θMb) each optimized for two directions are stored in the storage 151, the first wireless communication device 1 preferably selects a beam table used for wireless communication with the second wireless communication device 2 as follows. Here, M is an arbitrary natural number of 2 or more.

First, the first wireless communication device 1 specifies the number of second wireless communication devices 2. When the number of the second wireless communication devices 2 is one, the first wireless communication device 1 selects an optimized beam table OBT (θk) to be used for wireless communication with the second wireless communication device 2 in the same manner as described above. When the number of the second wireless communication devices 2 is two, the first wireless communication device 1 specifies the directions θa and θb in which the two second wireless communication devices 2 exist using the standard beam table SBT. Then, the first wireless communication device 1 selects the optimized beam table OBT (θka, θkb) where |θka−θa|+|θkb−θb| is the minimum from the optimized beam tables OBT (θ1a, θ1b), OBT (θ2a, θ2b), . . . , OBT (θMa, θMb) as a beam table used for wireless communication with the two second wireless communication devices 2. As a result, it is possible to reduce the decrease in wireless signal quality that may occur when the second wireless communication device 2 is located at a valley of the array factor.

In addition, when a plurality of optimized beam tables OBT (θ1), OBT (θ2), . . . , OBT (θN) each optimized for one direction, a plurality of optimized beam tables OBT (θ1a, θ1b), OBT (θ2a, θ2b), . . . , OBT (θMa, θMb) each optimized for two directions, and a plurality of optimized beam tables OBT (θ1a, θ1b, θ1c), OBT (θ2a, θ2b, θ2c), . . . , OBT (θLa, θLb, θLc) each optimized for three directions are stored in the storage 151, the first wireless communication device 1 preferably selects a beam table used for wireless communication with the second wireless communication device 2 as follows. Here, L is an arbitrary natural number of 2 or more.

First, the first wireless, communication device 1 specifies the number of second wireless communication devices 2. When the number of the second wireless communication devices 2 is one, the first wireless communication device 1 selects an optimized beam table OBT (θk) to be used for wireless communication with the second wireless communication device 2 in the same manner as described above. In addition, when the number of the second wireless communication devices 2 is two, the first wireless communication device 1 selects the optimized beam tables OBT (θka, θkb) to be used for wireless communication with the two second wireless communication devices 2 in the same manner as described above. When the number of the second wireless communication devices 2 is three, the first wireless communication device 1 specifies the directions θa, θb, and θc in which the three second wireless communication devices 2 exist using the standard beam table SBT. Then, the first wireless communication device 1 selects the optimized beam table OBT (θka, θkb, θkc) where |θka−θa|+|θkb−θb|+|θkc−θc| is the minimum from the optimized beam tables OBT (θ1a, θ1b, θ1c), OBT (θ2a, θ2b, θ2c), . . . , OBT (θLa, θLb, θLc) as a beam table used for wireless communication with the three second wireless communication devices 2. As a result, it is possible to reduce the decrease in wireless signal quality that may occur when the second wireless communication device 2 is located at a valley of the array factor.

When an optimized beam table optimized for four or more directions is stored in the storage 151, a beam table used for wireless communication with the second wireless communication device 2 is selected in similar method.

In some embodiments, it is preferable that the number of antenna weight vector sets constituting each optimized beam table OBT (θk) is the same as the number of antenna weight vector sets constituting the standard beam table SBT. As a result, each optimized beam table OBT (θk) can be processed without essentially changing the conventional mechanism for processing the standard beam table SBT.

In addition, the angular range covered by each optimized beam table OBT (θk) (from the 30° direction to the 150° direction in the examples shown in FIGS. 7, 10, 13, and 16 described later) can be easily matched with the angular range covered by the standard beam table SBT (from the 30° direction to the 150° direction in the example shown in FIG. 3 described above). As a result, even in an environment where the determination of the direction is temporarily hindered due to interference between radio waves propagated on different routes due to reflection or the like, the exploration in the other direction can be continuously performed. Therefore, the risk of interruption of wireless communication can be reduced.

In another embodiment, it is preferable that the number of antenna weight vector sets constituting each optimized beam table OBT (θk) is smaller than the number of antenna weight vector sets constituting the standard beam table SBT. Thereby, the data transfer amount when storing the optimized beam table OBT in the LUT 121 can be reduced. Therefore, the time required to store each optimized beam table OBT (θk) in the LUT 121 can be reduced. In addition, the time required for beamforming in association with each optimized beam table OBT (θk) can be reduced.

(First Specific Example of Standard Beam Table)

As a first specific example of the standard beam table, a standard beam table SBT constituted by fifteen antenna weight vector sets is considered. Assuming a beamforming antenna 13 including sixteen antenna elements that are equally spaced on the same line in the same plane, as the direction orthogonal to the plane is 90° direction, the standard beam table SBT is designed such that from the 30° direction to the 150° direction is covered.

Figure 3:
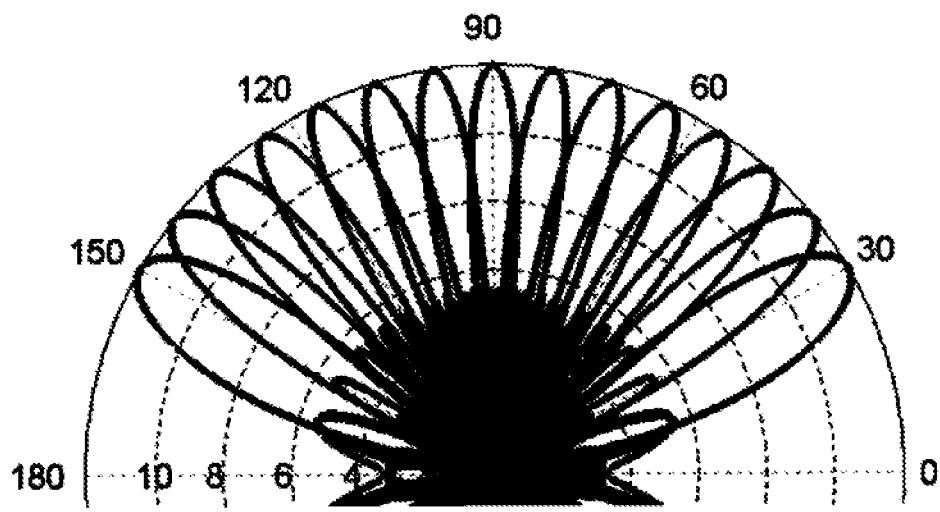
FIG. 3 is a graph regarding a first specific example of the standard beam table (standard beam table SBT) used by the first wireless, communication device shown in FIG. 2, and in particular, a graph (shown by the polar coordinate) showing an array factor corresponding to each antenna weight vector set constituting the standard beam table SBT.
Figure 4:
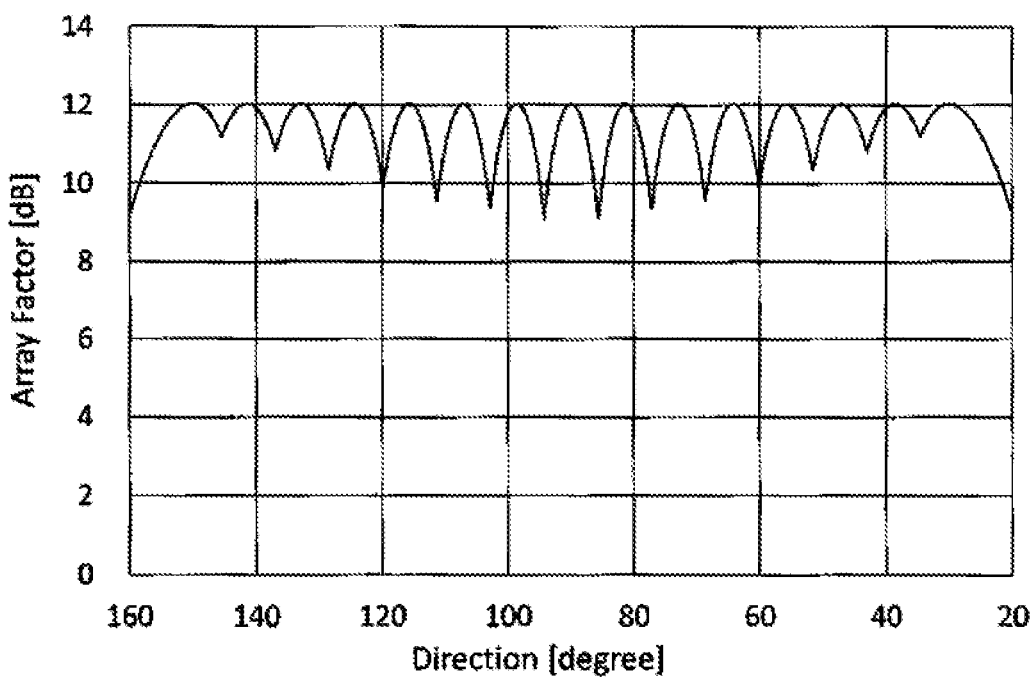
FIG. 4 is a graph regarding a first specific example of the standard beam table SBT used by the first wireless, communication device shown in FIG. 2, and in particular, a graph (shown by the orthogonal coordinate with a vertical axis representing gain and a horizontal axis representing direction) showing an envelope of the array factor shown in FIG. 3.
Figure 5:
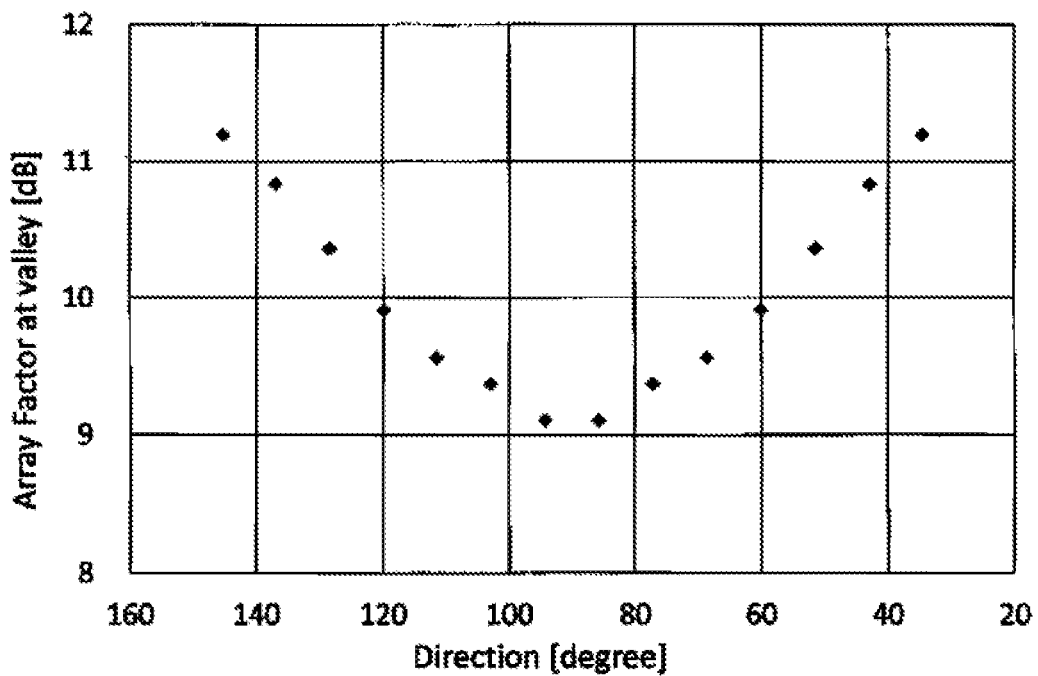
FIG. 5 is a graph regarding a first specific example of the standard beam table SBT used by the first wireless communication device shown in FIG. 2, and in particular, is a graph (shown by the orthogonal coordinate with a vertical axis representing gain and a horizontal axis representing direction) plotting picked-up valleys of the array factor shown in FIG. 3 (minimum points of the envelope shown in FIG. 4).

FIG. 3 is a graph (shown by the polar coordinate) showing an array factor corresponding to each antenna weight vector set constituting the standard beam table SBT designed as described above. FIG. 4 is a graph (shown by the orthogonal coordinate with a vertical axis representing gain and a horizontal axis representing direction) showing an envelope of the array factor shown in FIG. 3. FIG. 5 is a graph (shown by the orthogonal coordinate with a vertical axis representing gain and a horizontal axis representing direction) plotting picked-up valleys of the array factor shown in FIG. 3 (minimum points of the envelope shown in FIG. 4).

According to the graphs shown in FIGS. 4 and 5, it is found that the gain in the valley of the array factor depends on a direction. For example, the gain in the valley of the array factor is approximately 11.2 dB in the 145° direction and the 35° direction, whereas the gain in the valley of the array factor is approximately 9.1 dB in the vicinity of the 90° direction. Compared with 12 dB, which is the maximum gain of the array factor corresponding to each antenna weight vector set, the drop in the gain in the valley of the array factor varies from 0.8 dB to 2.9 dB. The drop in the gain in the valley of the array factor is maximum in the vicinity of the 90° direction, and gradually decreases as the distance from the 90° direction increases.

Figure 6:
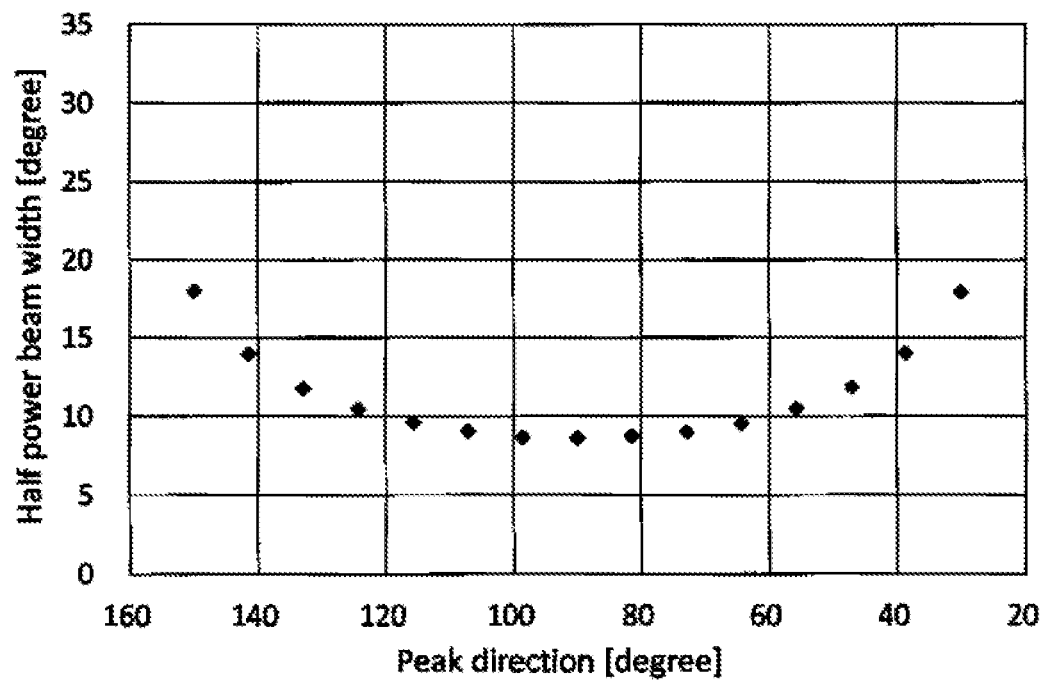
FIG. 6 is a graph regarding a first specific example of the standard beam table SBT used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the standard beam table SBT.

FIG. 6 is a graph plotting a half power beam width of the array factor corresponding to each antenna weight vector set constituting the standard beam table SBT designed as described above. The horizontal axis of the graph shown in FIG. 6 represents a peak direction of the array factor corresponding to each antenna weight vector set. According to the graph shown in FIG. 6, it is found that the half power beam width of the array factor is minimum in the 90° direction and increases as the distance from the 90° direction increases. This indicates that the array factor has the sharpest directivity in the 90° direction, and gradually changes to a broader pattern as the distance from the 90° direction increases. This is the reason that the drop in the gain in the valley of the array factor is the maximum in the 90° direction and gradually decreases as the distance from the 90° direction increases.

Assuming that the antenna elements constituting the beamforming antenna 13 are arranged along the x-axis of the orthogonal coordinate system in the xy plane, the 0° direction is the x-axis positive direction, the 90° direction is the z-axis positive direction, the 180° direction is the x-axis negative direction, and the 270° direction is the x-axis negative direction. In this case, the array factor is plane-symmetric with respect to the xy plane. For this reason, in the graph described above, the plot from the 180° direction to the 360° direction is omitted. In the graph described below, the plot front the 180° direction to the 360° direction is also omitted.

(First Specific Example of Optimized Beam Table Group)

As a first specific example of the optimized beam table group, an optimized beam table group suitable for using with the above-described standard beam table SBT will be considered. The optimized beam table group includes fifteen optimized beam tables OBT (30°), OBT (39°), OBT (47°), OBT (56°), OBT (64°), OBT (73°), OBT (81°), OBT (90°), OBT (99°), OBT (107°), OBT (116°), OBT (124°), OBT (133°), OBT (141°), and OBT (150°). Assuming a beamforming antenna 13 including sixteen antenna elements that are equally spaced on the same line in the same plane, as the direction orthogonal to the plane is 90° direction, each optimized beam table (θk) is designed such that from the 30° direction to the 150° direction is covered and is constituted by fifteen antenna weight vector sets. Hereinafter, three optimized beam tables OBT (90°), OBT (107°), and OBT (56°) optimized for the 90° direction, the 107° direction, and the 56° direction will be described as an example.

Figure 7:
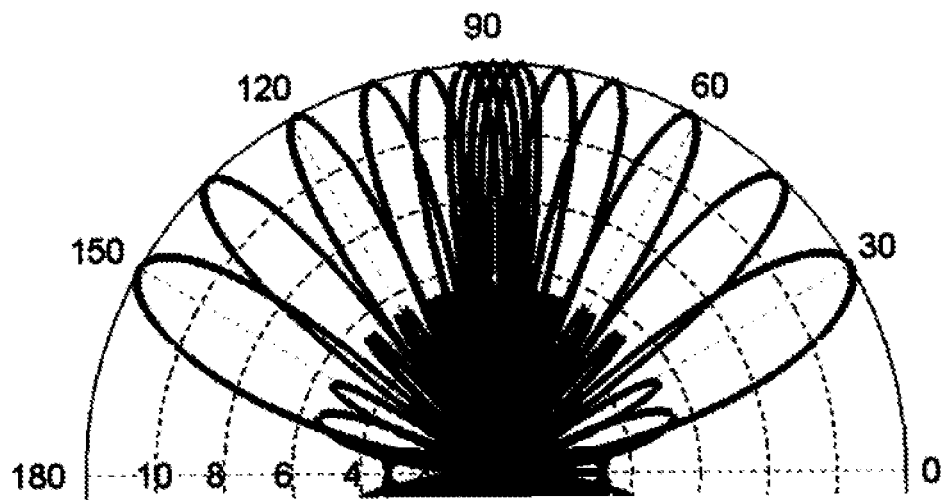
FIG. 7 is a graph regarding a first specific example of an optimized beam table group used by the first wireless communication device shown in FIG. 2, and in particular, a graph (shown by the polar coordinate) showing an array factor corresponding to each antenna weight vector set constituting the optimized beam table OBT (90°) included in the optimized beam table group.
Figure 8:
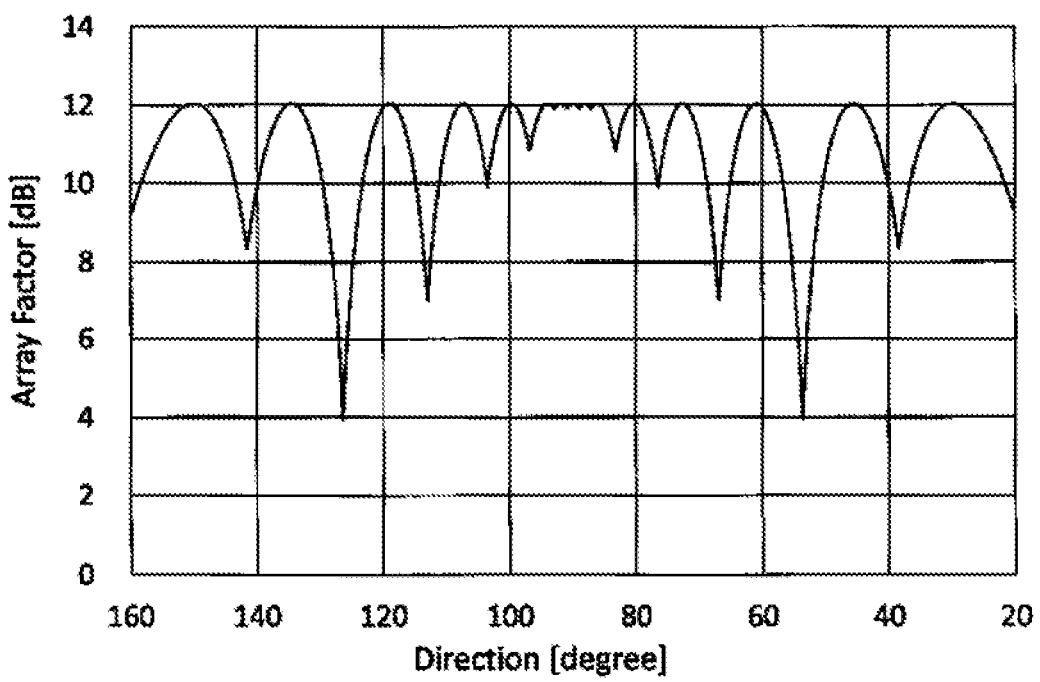
FIG. 8 is a graph regarding a first specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 7.
Figure 9:
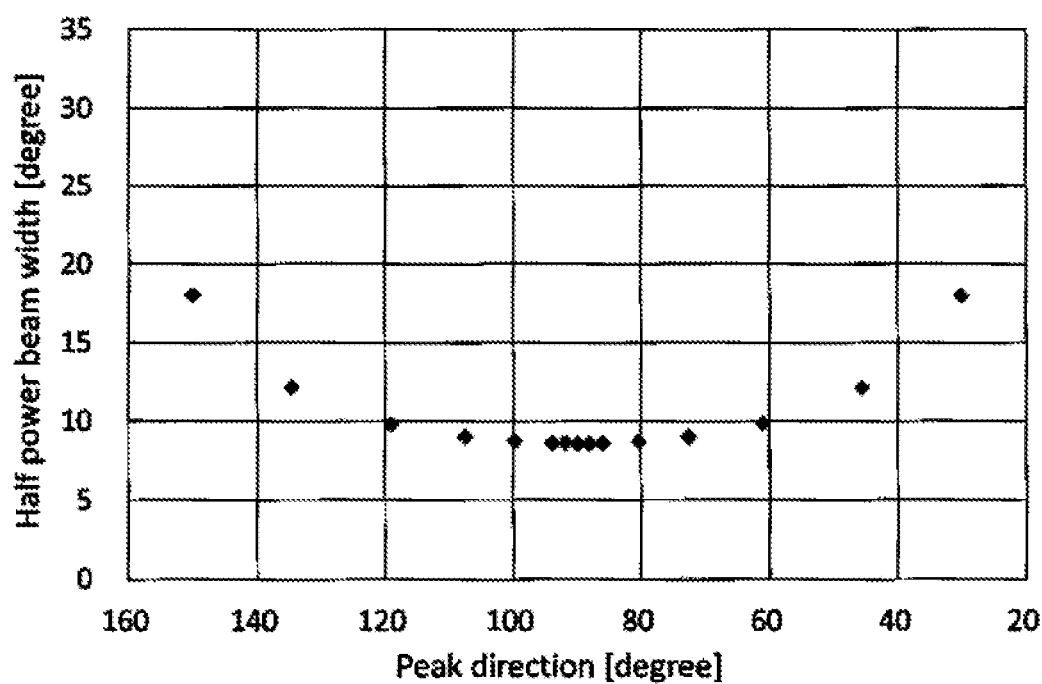
FIG. 9 is a graph regarding a first specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT (90°) included in the optimized beam table group.

First, the optimized beam table OBT (90°) will be described with reference to FIGS. 7-9. FIG. 7 is a graph (shown by polar coordinates) showing an array factor corresponding to each antenna weight vector set constituting the optimized beam table OBT (90°). FIG. 8 is a graph showing the envelope of the array factor shown in FIG. 7 (shown by the orthogonal coordinate with a vertical axis representing gain and a horizontal axis representing direction). FIG. 9 is a graph (shown by the orthogonal coordinate with a vertical axis representing half power beam width and a horizontal axis representing peak direction) plotting a half power beam width of the array factor corresponding to each antenna weight vector set constituting the optimized beam table OBT (90°).

When the graph shown in FIG. 7 is compared with the graph shown in FIG. 3, the following is found. That is, it is found that in the vicinity of the 90° direction, the peak direction of the array factor corresponding to each antenna weight vector set constituting the optimized beam table OBT (90°) is more densely distributed than the peak direction of the array factor corresponding to each antenna weight vector set constituting the standard beam table SBT.

When the graph shown in FIG. 8 is compared with the graph shown in FIG. 4, the following is found. That is, it is found that in the vicinity of the 90° direction, the valley of the array factor corresponding to each antenna weight vector set constituting the optimized beam table OBT (90°) has a smaller drop in gain than the valley of the array factor corresponding to each antenna weight vector set constituting the standard beam table SBT. Therefore, when the second wireless communication device 2 exists in the vicinity of the 90° direction (for example, the 94° direction or the 86° direction), it is better to use the optimized beam table OBT (90°) than to use the standard beam table SBT to perform better wireless communication between the first wireless communication device 1 and the second wireless communication device 2. For example, even in an environment where a low-speed MCS is selected when the standard beam table SBC is used, it is expected that a high-speed MCS is selected when the optimized beam table OBT (90°) is used.

Figure 10:
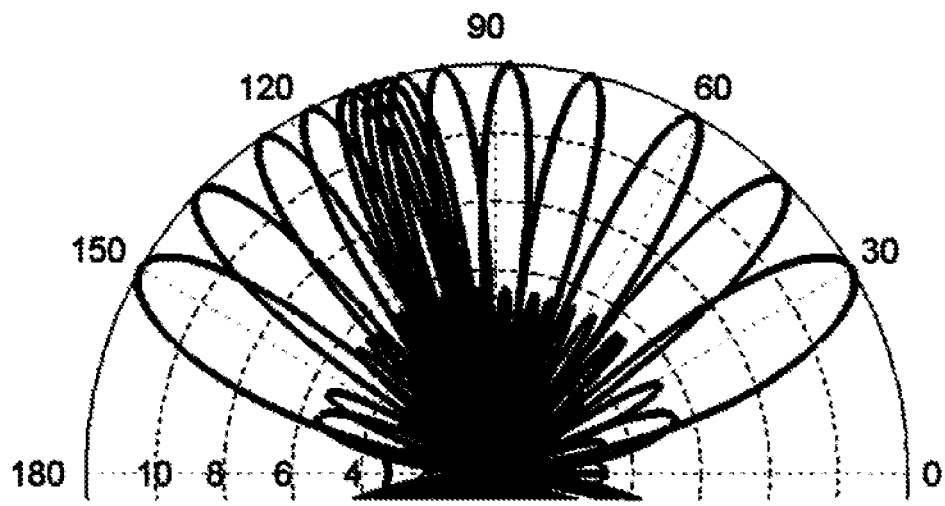
FIG. 10 is a graph regarding a first specific example of an optimized beam table group used by the first wireless communication device shown in FIG. 2, and in particular, a graph (shown by the polar coordinate) showing an array factor corresponding to each antenna weight vector set constituting the optimized beam table OBT (107°) included in the optimized beam table group.
Figure 11:
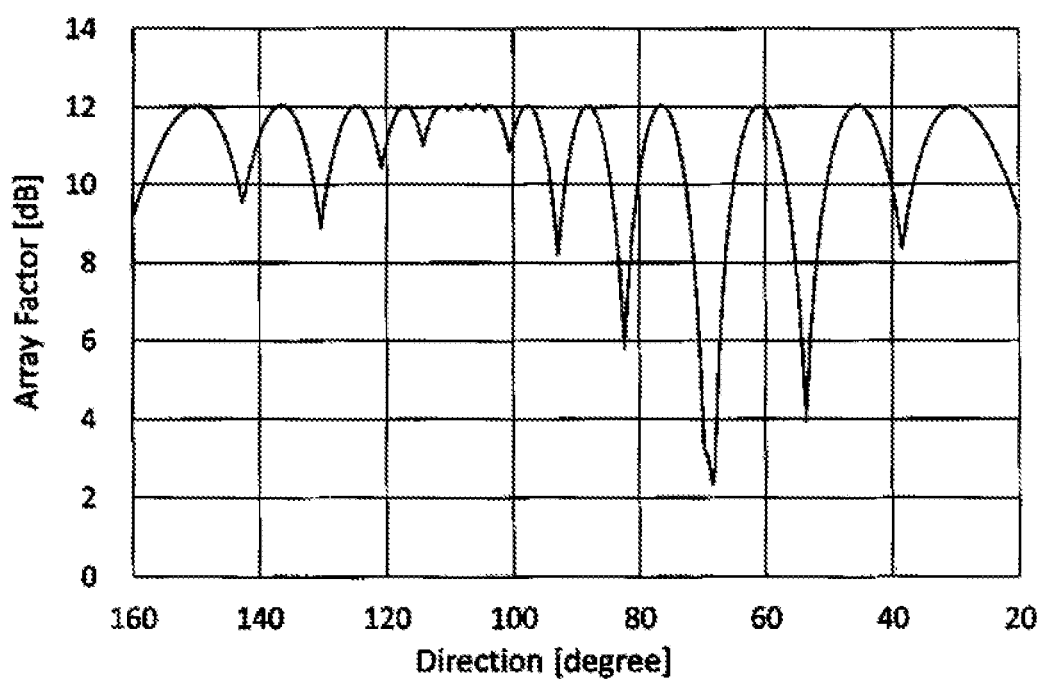
FIG. 11 is a graph regarding a first specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 10.
Figure 12:
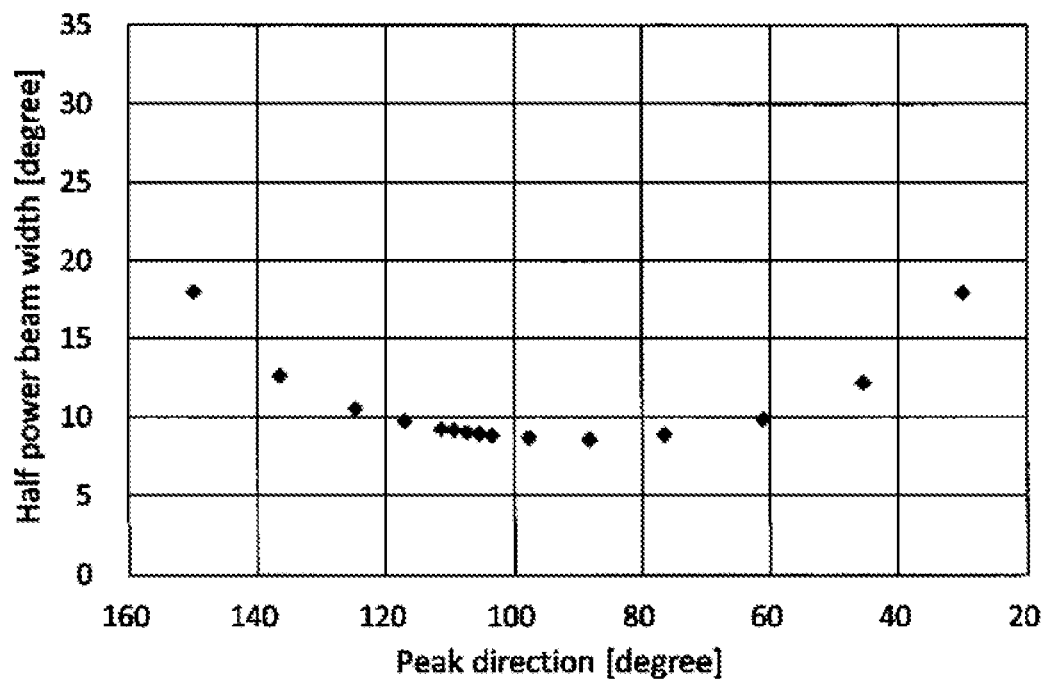
FIG. 12 is a graph regarding a first specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT (107°) included in the optimized beam table group.

Next, the optimized beam table OBT (107°) will be described with reference to FIGS. 10-12. FIG. 10 is a graph (shown by the polar coordinate) showing an array factor corresponding to each antenna weight vector set constituting the optimized beam table OBT (107°). FIG. 11 is a graph showing the envelope of the array factor shown in FIG. 10 (shown by the orthogonal coordinate with a vertical axis representing gain and a horizontal axis representing direction). FIG. 12 is a graph (shown by the orthogonal coordinate with a vertical axis representing half power beam width and a horizontal axis representing peak direction) plotting a half power beam width of the array factor corresponding to each antenna weight vector set constituting the optimized beam table OBT 107°).

When the graph shown in FIG. 10 is compared with the graph shown in FIG. 3, the following is found. That is, it is found that in the vicinity of the 107° direction, the peak direction of the array factor corresponding to each antenna weight vector set constituting the optimized beam table OBT (107°) is more densely distributed than the peak direction of the array factor corresponding to each antenna weight vector set constituting the standard beam table SBT.

When the graph shown in FIG. 11 is compared with the graph shown in FIG. 4, the following is found. That is, it is found that in the vicinity of the 107° direction, the valley of the array factor corresponding to each antenna weight vector set constituting the optimized beam table OBT (107°) has a smaller drop in gain than the valley of the array factor corresponding to each antenna weight vector set constituting the standard beam table SBT. Therefore, when the second wireless communication device 2 exists in the vicinity of the 107° direction (for example, the 111° direction or the 103° direction), it is better to use the optimized beam table OBT (107°) than to use the standard beam table SBT to perform better wireless communication between the first wireless communication device 1 and the second wireless communication device 2. For example, even in an environment where a low-speed MCS is selected when the standard beam table SBC is used, it is expected that a high-speed MCS is selected when the optimized beam table OBT (107°) is used.

Figure 13:
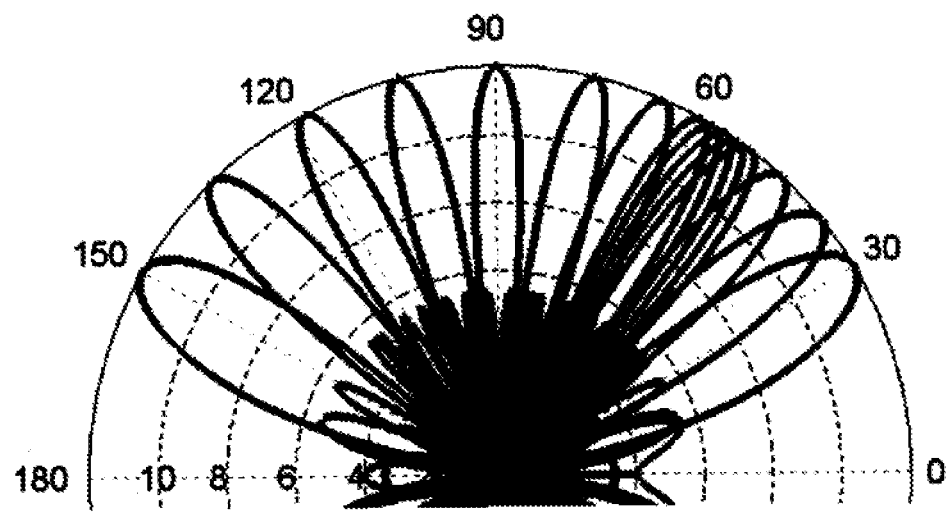
FIG. 13 is a graph regarding a first specific example of an optimized beam table group used by the first wireless communication device shown in FIG. 2, and in particular, a graph (shown by the polar coordinate) showing an array factor corresponding to each antenna weight vector set constituting the optimized beam table OBT (56°) included in the optimized beam table group.
Figure 14:
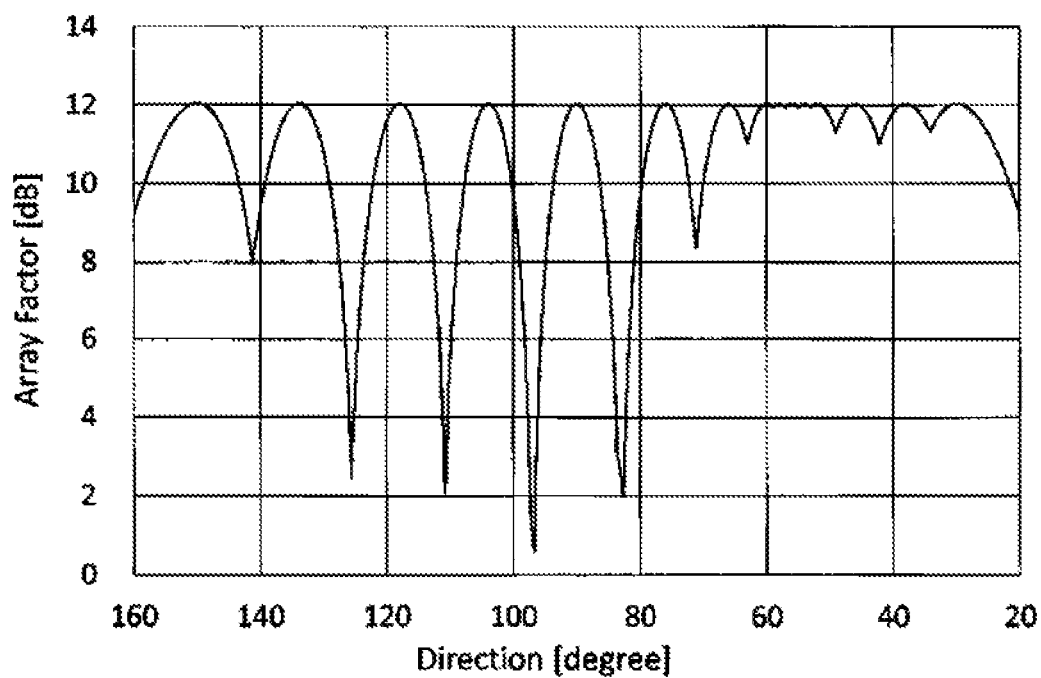
FIG. 14 is a graph regarding a first specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 13.
Figure 15:
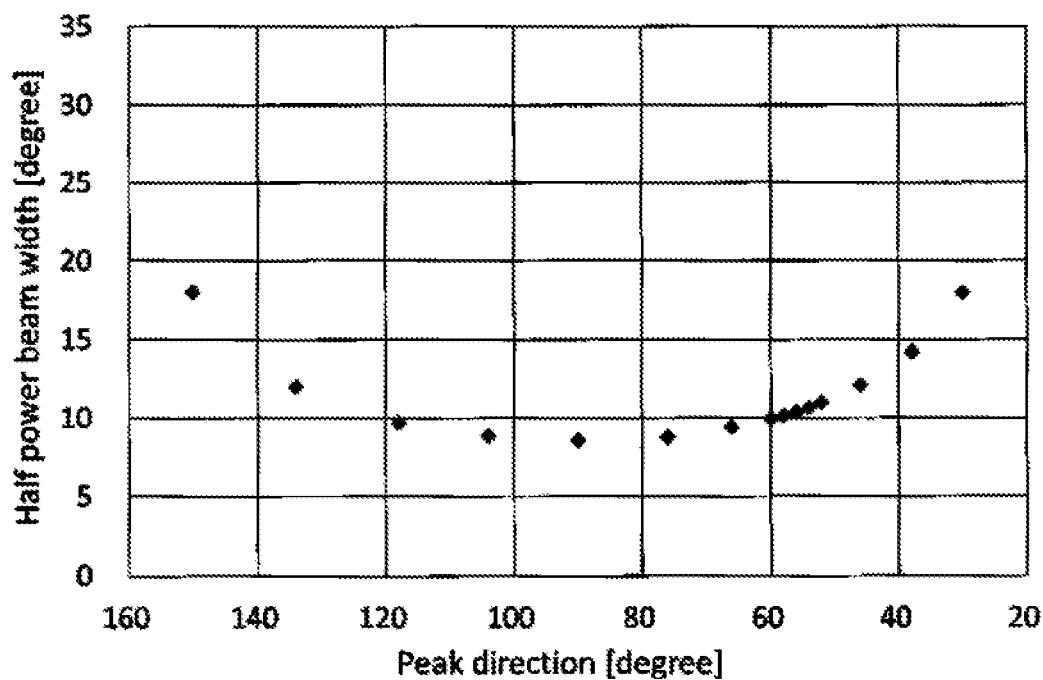
FIG. 15 is a graph regarding a first specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT (56°) included in the optimized beam table group.

Finally, the optimized beam table OBT (56°) will be described with reference to FIGS. 13-15. FIG. 13 is a graph (shown by polar coordinates) showing an array factor corresponding to each antenna weight vector set constituting the optimized beam table OBT (56°). FIG. 14 is a graph showing the envelope of the array factor shown in FIG. 13 (shown by the orthogonal coordinate with a vertical axis representing gain and a horizontal axis representing direction). FIG. 15 is a graph (shown by the orthogonal coordinate with a vertical axis representing half power beam width and a horizontal axis representing peak direction) plotting a half power beam width of the array factor corresponding to each antenna weight vector set constituting the optimized beam table OBT (56°).

When the graph shown in FIG. 13 is compared with the graph shown in FIG. 3, the following is found. That is, it is found that in the vicinity of the 56° direction, the peak direction of the array factor corresponding to each antenna weight vector set constituting the optimized beam table OBT (56°) is more densely distributed than the peak direction of the array factor corresponding to each antenna weight vector set constituting the standard beam table SBT.

When the graph shown in FIG. 14 is compared with the graph shown in FIG. 4, the following is found. That is, it is found that in the vicinity of the 56° direction, the valley of the array factor corresponding to each antenna weight vector set constituting the optimized beam table OBT (56°) has a smaller drop in gain than the valley of the array factor corresponding to each antenna weight vector set constituting the standard beam table SBT. Therefore, when the second wireless communication device 2 exists in the vicinity of the 56° direction (for example, the 61° direction or the 53° direction), it is better to use the optimized beam table OBT (56°) than to use the standard beam table SBT to perform better wireless communication between the first wireless communication device 1 and the second wireless communication device 2. For example, even in an environment where a low-speed MCS is selected when the standard beam table SBC is used, it is expected that a high-speed MCS is selected when the optimized beam table OBT (56°) is used.

The optimized beam table group according to the present specific example may include an optimized beam table optimized in two or more directions. For example, assuming that the number of directions to be optimized is N, the number of the optimized beam tables is $_NC_2$ for the tables optimized with respect to two directions, and the number of the optimized beam table is $_NC_3$ for the tables optimized with respect to three directions. As an example of such an optimized beam table, an optimized beam table OBT (64°, 124°) constituted by fifteen antenna weight vector sets optimized for the 64° direction and the 124° direction is considered. Assuming a beamforming antenna 13 including sixteen antenna elements that are equally spaced on the same line in the same plane similar to the standard beam table SBT, as the direction orthogonal to the plane is 90° direction, the optimized beam table OBT (64°, 124°) is designed such that from the 30° direction to the 150° direction is covered.

Figure 16:
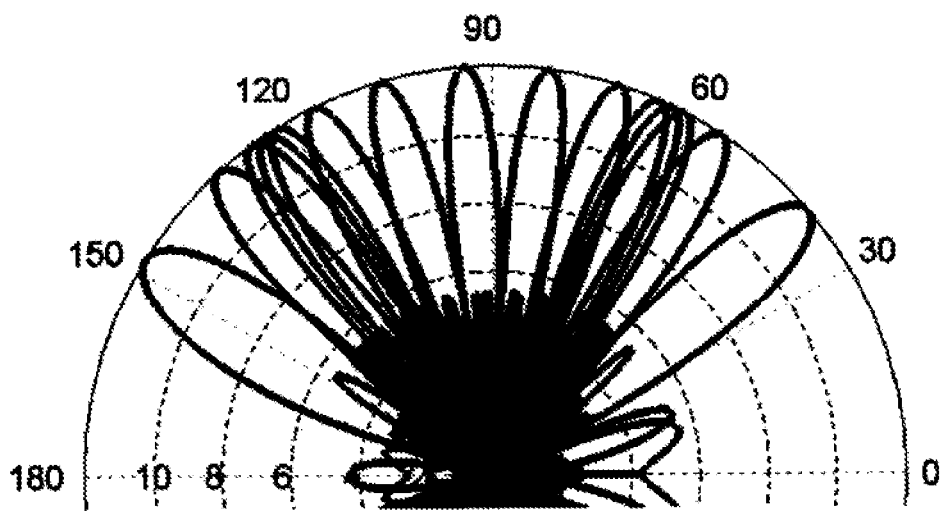
FIG. 16 is a graph regarding a first specific example of an optimized beam-table group used by the first wireless communication device shown in FIG. 2, and in particular, a graph (shown by the polar coordinate) showing an array factor corresponding to each antenna weight vector constituting the optimized beam table OBT (64°, 124°) included in the optimized beam table group.
Figure 17:
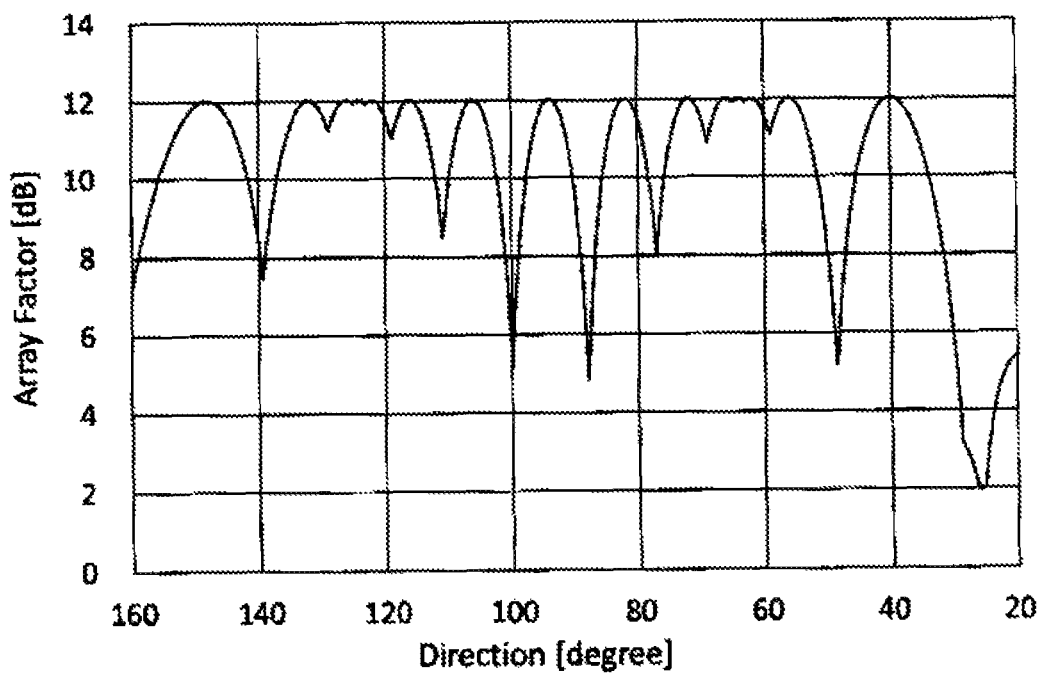
FIG. 17 is a graph regarding a first specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 16.
Figure 18:
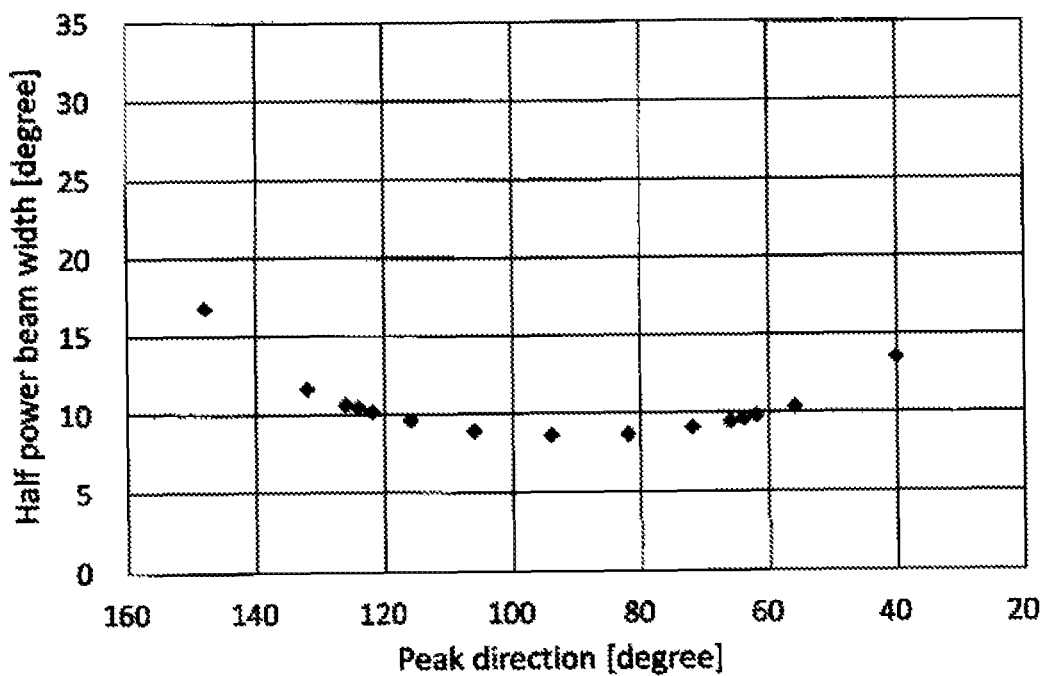
FIG. 18 is a graph regarding a first specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT (64°, 124°) included in the optimized beam table group.

FIG. 16 is a graph (shown by the polar coordinate) showing an array factor corresponding to each antenna weight vector set constituting the optimized beam table OBT (64°, 124°) designed as described above. FIG. 17 is a graph (shown by the orthogonal coordinate with a vertical axis representing gain and a horizontal axis representing direction) showing an envelope of the array factor shown in FIG. 16. FIG. 18 is a graph (shown by the orthogonal coordinate with a vertical axis representing half power beam width and a horizontal axis representing peak direction) plotting a half power beam width of the array factor corresponding to each antenna weight vector set constituting the optimized beam table OBT (64°, 124°).

When the graph shown in FIG. 16 is compared with the graph shown in FIG. 3, the following is found. That is, it is found that in the vicinity of the 64° direction and the 124° direction, the peak direction of the array factor corresponding to each antenna weight vector set constituting the optimized beam table OBT (64°, 124°) is more densely distributed than the peak direction of the array factor corresponding to each antenna weight vector set constituting the standard beam table SBT.

When the graph shown in FIG. 17 is compared with the graph shown in FIG. 4, the following is found. That is, it is found that in the vicinity of the 64° direction and the 124° direction, the valley of the array factor corresponding to each antenna weight vector set constituting the optimized beam table OBT (64°, 124°) has a smaller drop in gain than the valley of the array factor corresponding to each antenna weight vector set constituting the standard beam table SBT. Therefore, when one of the two second wireless communication devices 2 exists in the vicinity of the 64° direction and the other exists in the vicinity of the 124° direction, it is better to use the optimized beam table OBT (64°, 124°) than to use the standard beam table SBT to perform better wireless communication between the first wireless communication device 1 and the two second wireless communication devices 2. For example, even in an environment where a low-speed MCS is selected when the standard beam table SBT is used, it is expected that a high-speed MCS is selected when the optimized beam table OBT (64°, 124°) is used.

In the above-described optimized beam tables OBT (90°), OBT (107°), OBT (56°), and OBT (64°, 124°), regarding the peak direction of the array factor corresponding to each antenna weight vector set, the maximum value of the difference between two peak directions adjacent to each other in the angular space is at least a double of the minimum value of the difference between the two peak directions adjacent to each other in the angular space. As a result, the drop in gain in the valley of the array factor close to the direction to be optimized is reduced to be sufficiently small.

(Second Specific Example of Optimized Beam Table Group)

In the above-described embodiments, as the optimized beam table OBT (θk), a beam table is used in which the distribution in the peak direction of the array factor corresponding to each antenna weight vector set is dense in a specific direction (θk direction), and become gradually sparser as the distance from the direction increases. As a result, the decrease in gain that may occur in the wireless communication with the second wireless communication device 2 existing in a direction close to a specific direction can be reduced. However, as suggested by the graphs shown in FIGS. 7, 10, 13, and 16, in the wireless communication with the second wireless communication device 2 existing in a direction far from a specific direction, the decrease in gain that cannot be ignored may occur (for example, the decrease in gain that falls below the gain of the array factor corresponding to the antenna weight vector set of the standard beam table SBT). This is because the distribution of the array factor corresponding to each antenna weight vector set in the peak direction becomes sparse (the interval is widened) in a direction far from the specific direction, and the drop in gain in the valley of the array factor becomes large.

In order to avoid such a problem, as the optimized beam table OBT (θk), it is preferable to use a beam table in which the half power beam width of the array factor corresponding to each antenna weight vector set is minimum in a specific direction (direction in which a distribution of the peak direction of the array factor corresponding to each antenna weight vector set is the densest) and is gradually increases as the distance from a specific direction increases.

As a second specific example of the optimized beam table group, the optimized beam table group constituted by fifteen optimized beam tables OBT'(30°), OBT'(39°), OBT'(47°), OBT'(56°), OBT'(64°), OBT'(73°), OBT'(81°), OBT'(90°), OBT'(99°), OBT'(107°), OBT'(16°), OBT'(124°), OBT'

(133°), OBT'(141°), and OBT'(150°) will be considered. Each of the optimized beam tables OBT'(θk) is obtained by improving the optimized beam table OBT (θk) included in the optimized beam table group according to the first specific example in the above-described matter. Hereinafter, three optimized beam tables OBT'(90°), OBT'(107°), and OBT'(56°) optimized for the 90° direction, the 107° direction, and the 56° direction will be described as examples.

Figure 19:
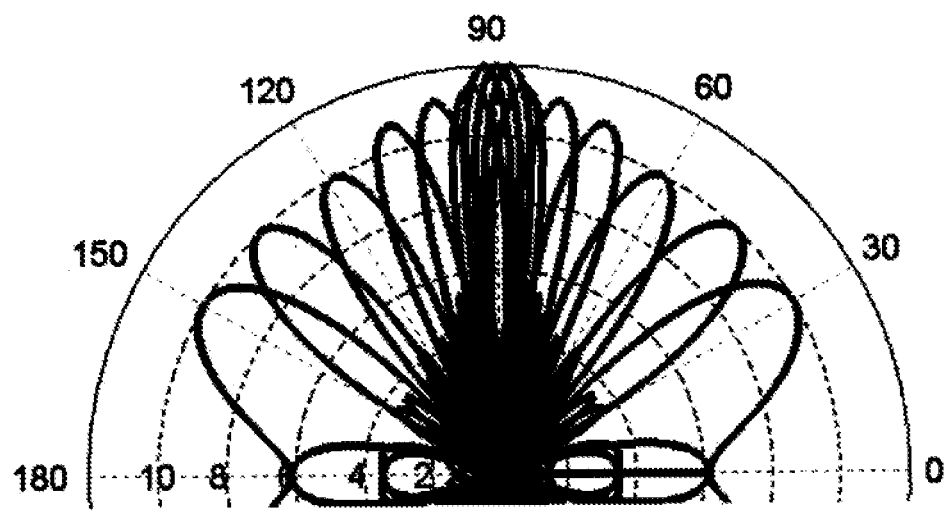
FIG. 19 is a graph regarding a second specific example of an optimized beam table group used by the first wireless communication device shown in FIG. 2, and in particular, a graph (shown by the polar coordinate) showing an array factor corresponding to each antenna weight vector set constituting the optimized beam table OBT'(90°) included in the optimized beam table group.
Figure 20:
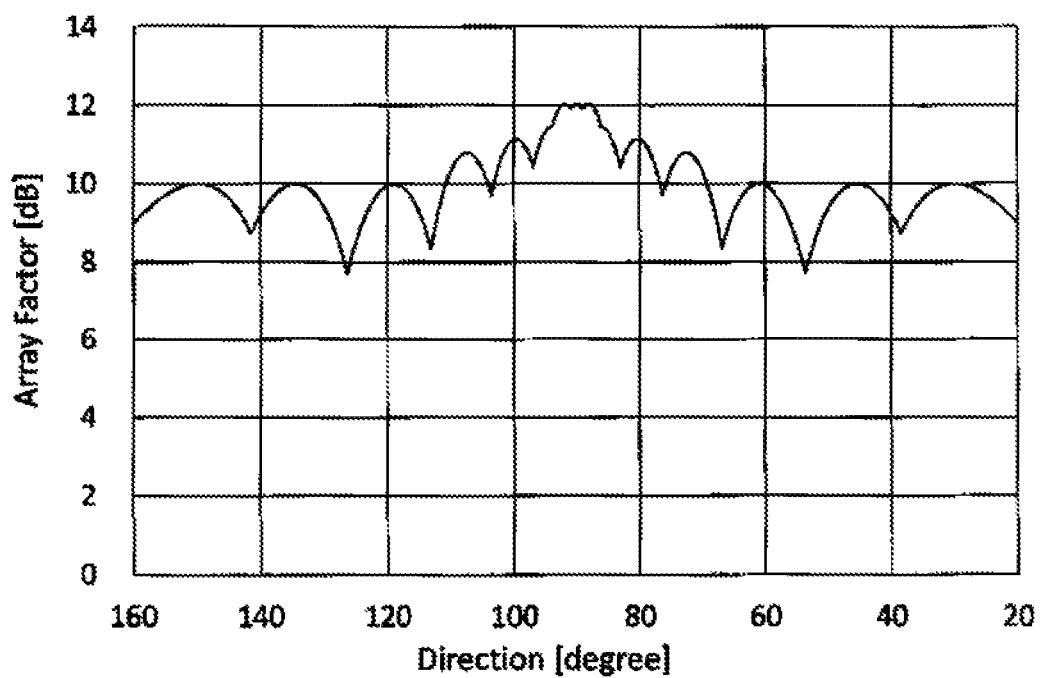
FIG. 20 is a graph regarding a second specific example of an optimized beam-table group used by the first wireless communication device shown in FIG. 2, and in particular, a graph (shown by the orthogonal coordinate with a vertical axis representing gain and a horizontal axis representing direction) showing an envelope of the array factor shown in FIG. 19.
Figure 21:
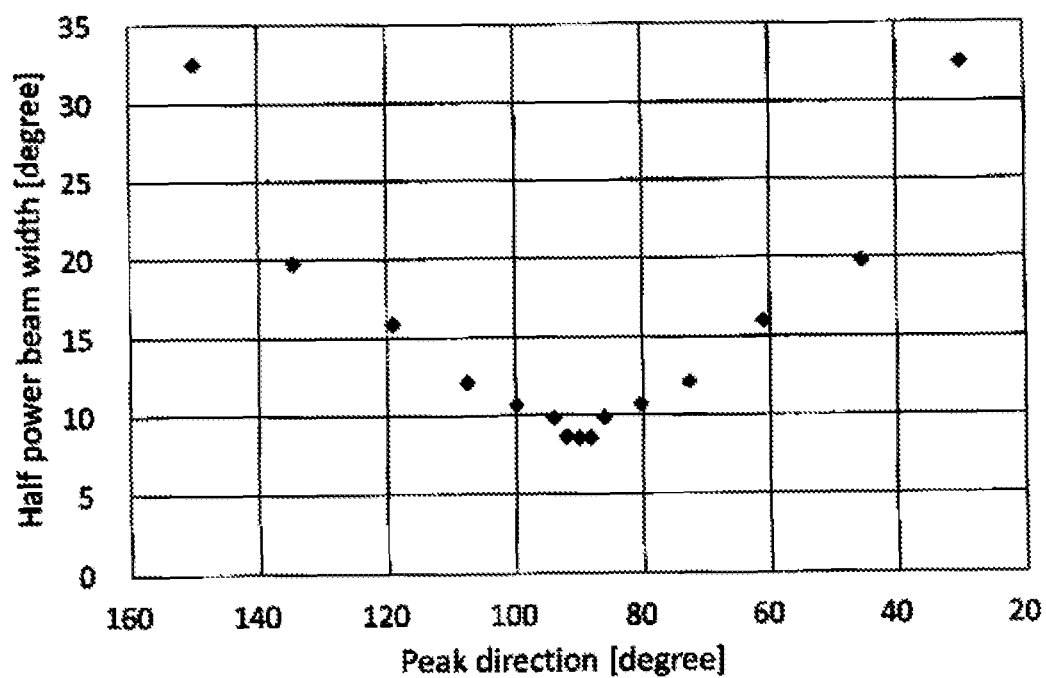
FIG. 21 is a graph regarding a second specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT'(90°) included in the optimized beam table group.

First, the improved optimized beam table OBT'(90°) will be described with reference to FIGS. 19-21. FIG. 19 is a graph (shown by the polar coordinate) showing an array factor corresponding to each antenna weight vector set constituting the improved optimized beam table OBT'(90°). FIG. 20 is a graph showing an envelope of the array factor shown in FIG. 19 (shown by the orthogonal coordinate with a vertical axis representing gain and a horizontal axis representing direction). FIG. 21 is a graph (shown by the orthogonal coordinate with a vertical axis representing half power beam width and a horizontal axis representing peak direction) plotting a half power beam width of the array factor corresponding to each antenna weight vector set constituting the improved optimized beam table OBT'(90°).

As shown in FIG. 21, the half power beam width of the array factor corresponding to each antenna weight vector set constituting the improved optimized beam table OBT'(90°) is minimum in the 90° direction and gradually increases as a distance from the 90° direction increases. At this time, the increasing rate of the half power beam width of the army factor is larger than that of the optimized beam table OBT (90°) before the improvement. For this reason, in the direction far from the 90° direction, the drop in gain in the valley of the array factor is smaller than the drop in gain in the optimized beam table OBT (90°) before the improvement. Therefore, the decrease in gain that may occur in a direction far from the 90° direction can be reduced. For example, the gain in the deepest valley of the array factor can be increased from 3.9 dB (before improvement) to 7.7 dB (after improvement).

Figure 22:
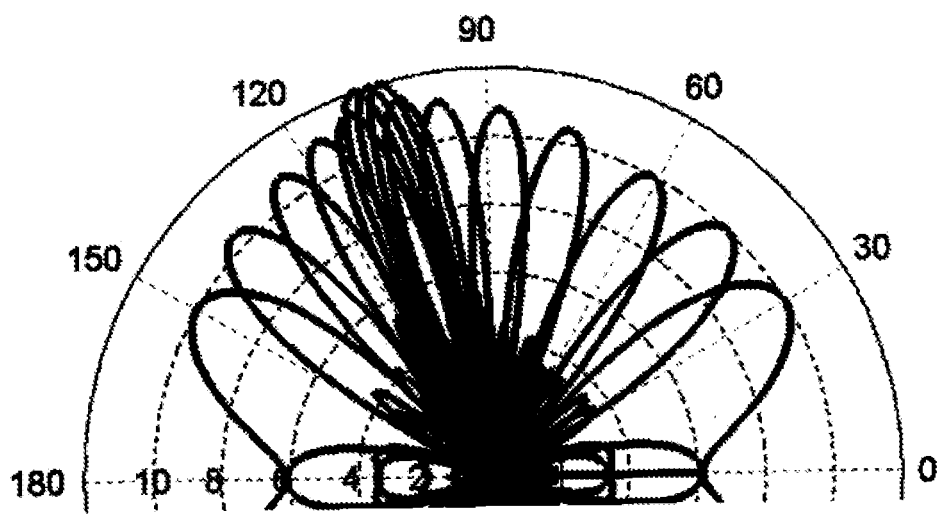
FIG. 22 is a graph regarding a second specific example of an optimized beam-table group used by the first wireless communication device shown in FIG. 2, and in particular, a graph (shown by the polar coordinate) showing an array factor corresponding to each antenna weight vector se constituting the optimized beam table OBT'(107°) included in the optimized beam table group.
Figure 23:
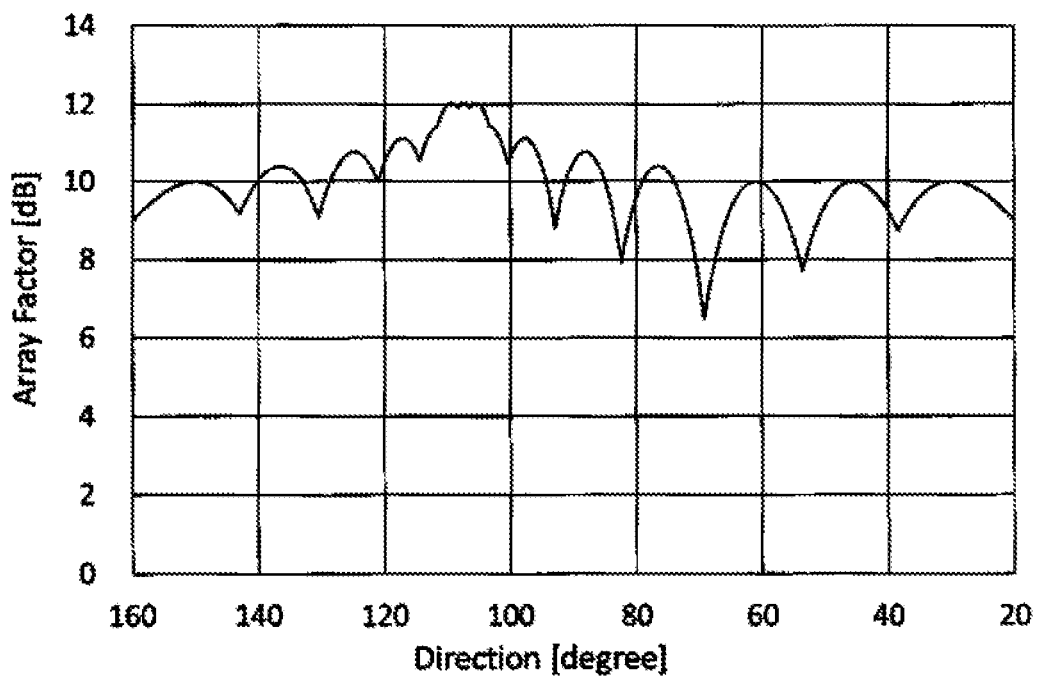
FIG. 23 is a graph regarding a second specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 22.
Figure 24:
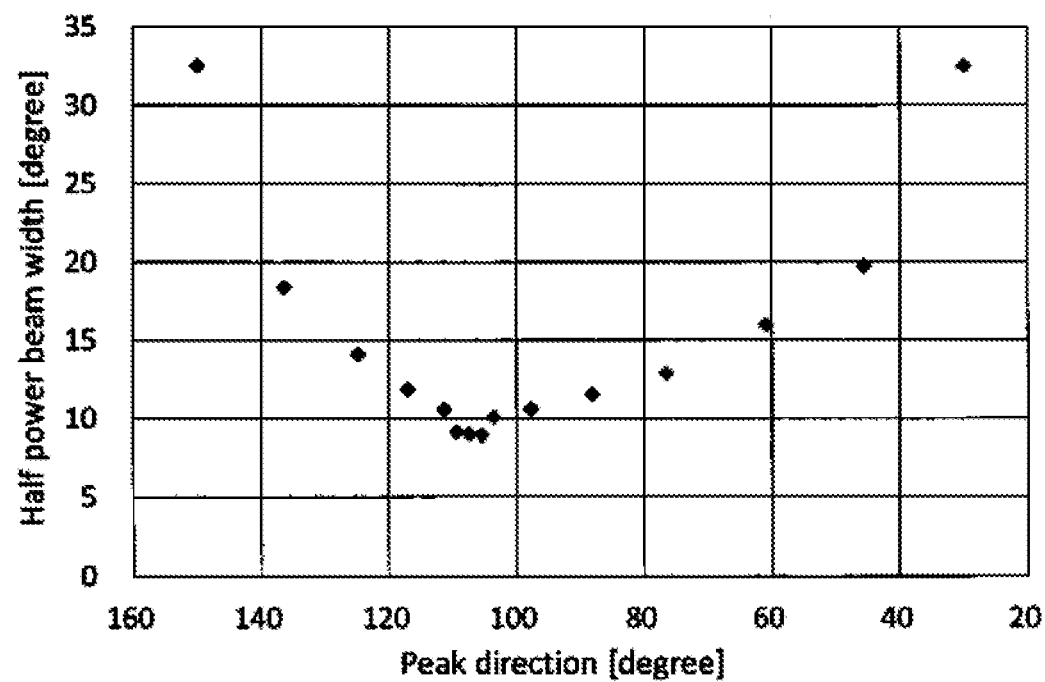
FIG. 24 is a graph regarding a second specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT'(107°) included in the optimized beam table group.

Next, the improved optimized beam table OBT'(107°) will be described with reference to FIGS. 22-24. FIG. 22 is a graph (shown by the polar coordinate) showing an array factor corresponding to each antenna weight vector set constituting the improved optimized beam table OBT'(107°). FIG. 23 is a graph showing an envelope of the array factor shown in FIG. 22 shown by the orthogonal coordinate with a vertical axis representing gain and a horizontal axis representing direction). FIG. 24 is a graph (shown by the orthogonal coordinate with a vertical axis representing half power beam width and a horizontal axis representing peak direction) plotting a half power beam width of the array factor corresponding to each antenna weight vector set constituting the improved optimized beam table OBT'(107°).

As shown in FIG. 24, the half power beam width of the array factor corresponding to each antenna weight vector set constituting the improved optimized beam table OBT'(107°) is minimum in the 107° direction and gradually increases as a distance from the 107° direction increases. At this time, the increasing rate of the half power beam width of the array factor gradually increasing as a distance from the 107° direction increases is larger than that of the optimized beam table OBT (107°) before the improvement. For this reason, in the direction far from the 107° direction, the drop in gain in the valley of the array factor is smaller than the drop in gain in the optimized beam table OBT (107°) before the improvement. Therefore, the decrease in gain that may occur in a direction far from the 107° direction can be reduced. For example, the gain in the deepest valley of the array factor can be increased from 2.3 dB (before improvement) to 6.5 dB (after improvement).

Figure 25:
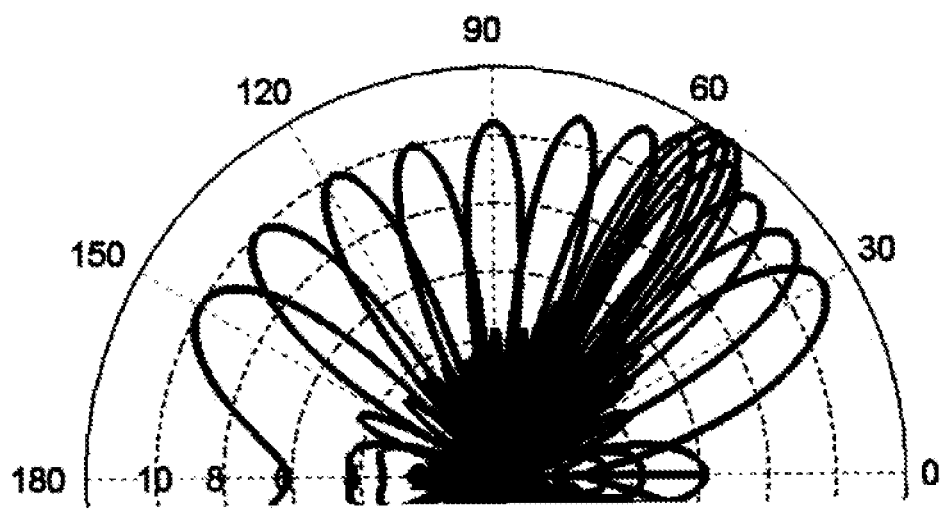
FIG. 25 is a graph regarding a second specific example of an optimized beam table group used by the first wireless communication device shown in FIG. 2, and in particular, a graph (shown by the polar coordinate) showing an array factor corresponding to each antenna weight vector set constituting the optimized beam table OBT'(56°) included in the optimized beam table group.
Figure 26:
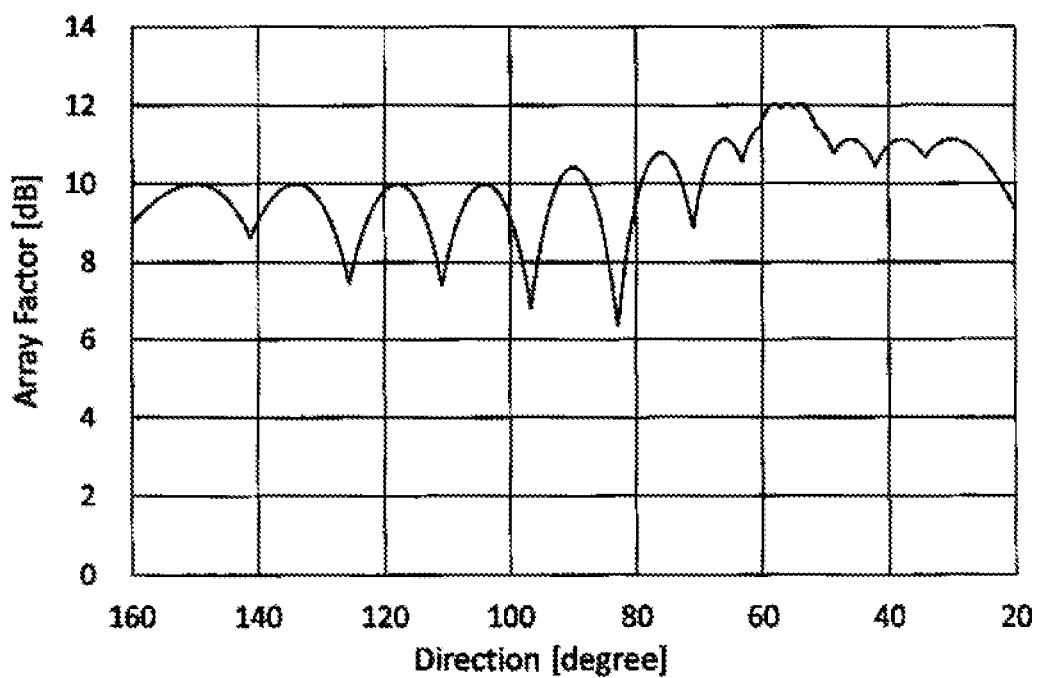
FIG. 26 is a graph regarding a second specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 25.
Figure 27:
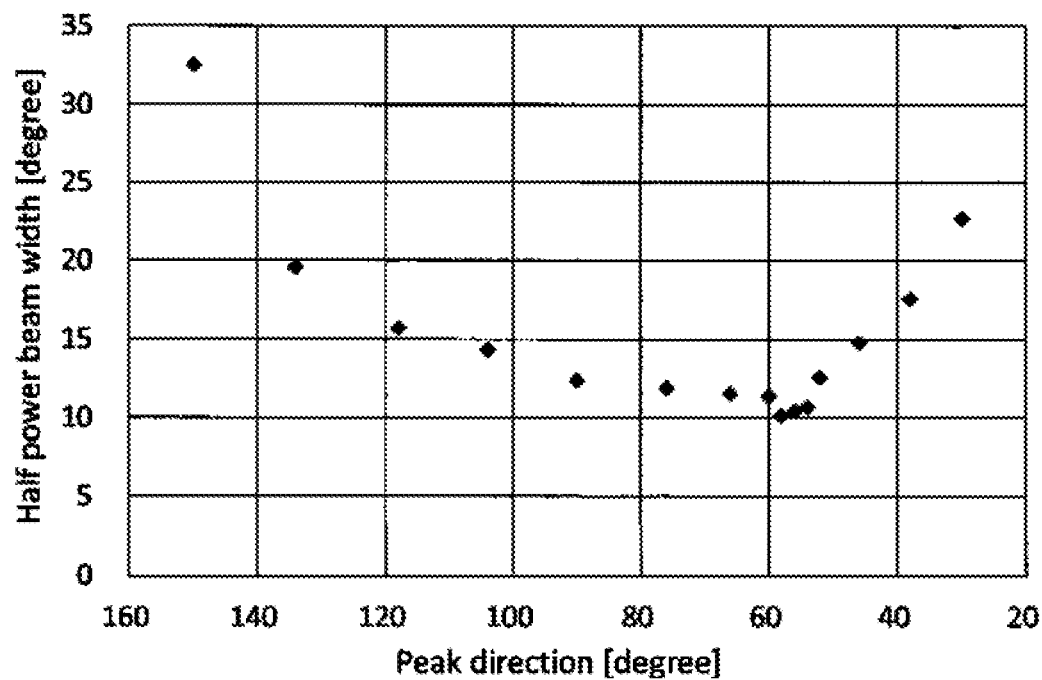
FIG. 27 is a graph regarding a second specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT'(56°) included in the optimized beam able group.

Finally, the improved optimized beam table OBT'(56°) will be described with reference to FIGS. 25-27. FIG. 25 is a graph (shown by the polar coordinate) showing an array factor corresponding to each antenna weight vector set constituting the improved optimized beam table OBT'(56°). FIG. 26 is a graph showing an envelope of the array factor shown in FIG. 25 (shown by the orthogonal coordinate with a vertical axis representing gain and a horizontal axis representing direction). FIG. 27 is a graph (shown by the orthogonal coordinate with a vertical axis representing half power beam width and a horizontal axis representing peak direction) plotting a half power beam width of the array factor corresponding to each antenna weight vector set constituting the improved optimized beam table OBT'(56°).

As shown in FIG. 27, the half power beam width of the array factor corresponding to each antenna weight vector set constituting the improved optimized beam table OBT'(56°) is minimum in the 56° direction and gradually increases as a distance from the 56° direction increases. At this time, the increasing rate of the half power beam width of the array factor gradually increasing as a distance from the 56° direction increases is larger than that of the optimized beam table OBT (56°) before the improvement. For this reason, in the direction far from the 56° direction, the drop in gain in the valley of the array factor is smaller than the drop in gain in the optimized beam table OBT (56°) before the improvement. Therefore, the decrease in gain that may occur in a direction far from the 56° direction can be reduced. For example, the gain in the deepest valley of the array factor can be increased from 0.6 dB (before improvement) to 6.3 dB (after improvement).

Figure 28:
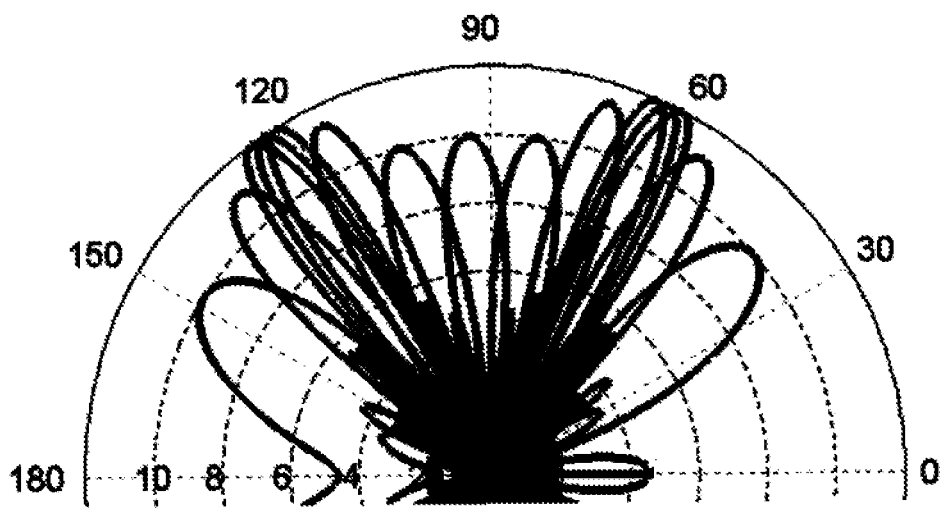
FIG. 28 is a graph regarding a second specific example of an optimized beam table group used by the first wireless communication device shown in FIG. 2, and in particular, a graph (shown by the polar coordinate) showing an array factor corresponding to each antenna weight vector set constituting the optimized beam table OBT'(64°, 124°) included in the optimized beam table group.
Figure 29:
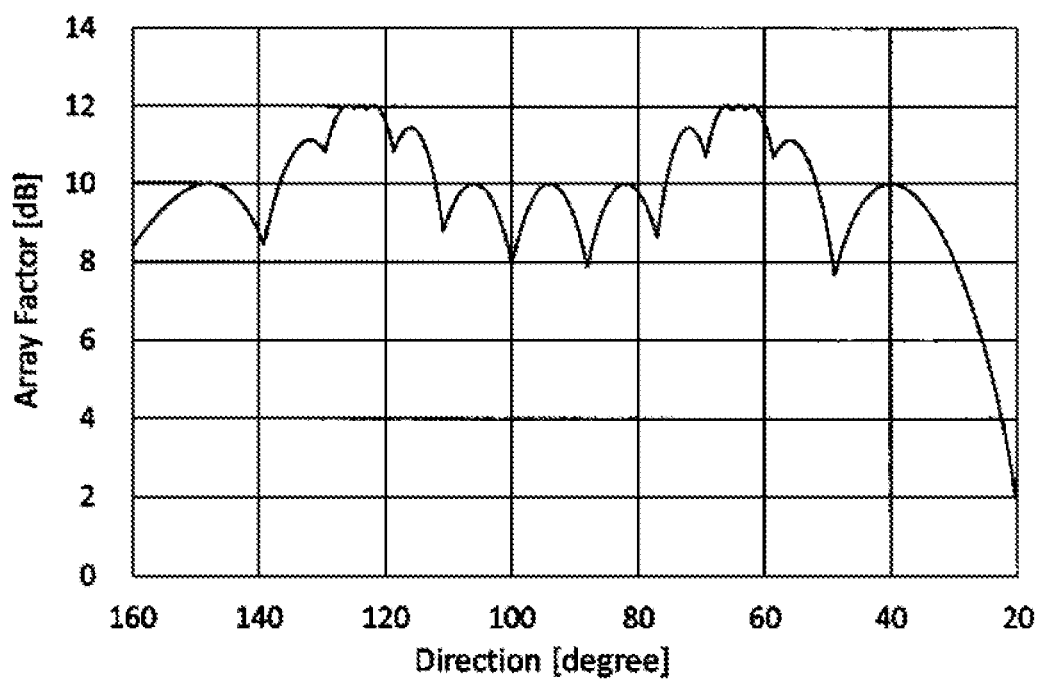
FIG. 29 is a graph regarding a second specific example of an optimized beam table group used by the first wireless communication device shown in FIG. 2, and in particular, a graph (shown by the orthogonal coordinate with a vertical axis representing gain and a horizontal axis representing direction) showing an envelope of the array factor shown in FIG. 28.
Figure 30:
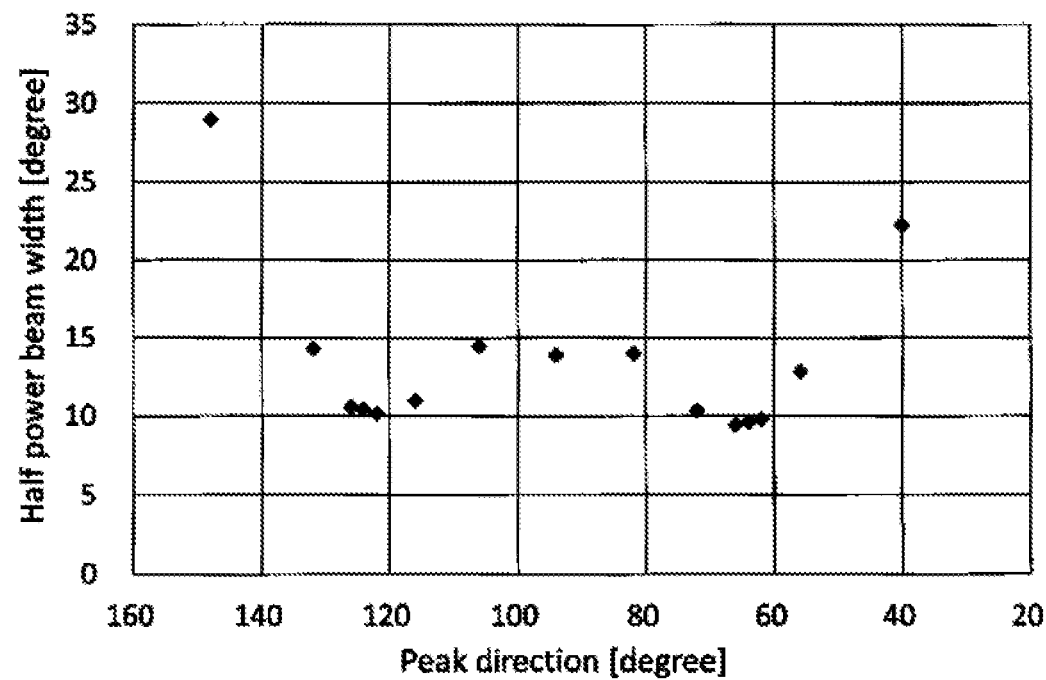
FIG. 30 is a graph regarding a second specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT'(64°, 124°) included in the optimized beam table group.

The optimized beam table group according to the present specific example may include an optimized beam table optimized in two or more directions. For example, assuming that the number of directions to be optimized is N, the number of the optimized beam table is $_NC_2$ for the tables optimized with respect to two directions, and the number of the optimized beam table is $_NC_3$ for the tables optimized with respect to three directions. As an example of such an optimized beam table, an optimized beam table OBT'(64°, 124°) obtained by improving the above-described optimized beam table OBT (64°, 124°) is considered. FIG. 28 is a graph (shown by the polar coordinate) showing an array factor corresponding to each antenna weight vector set constituting the improved optimized beam table OBT'(64°, 124°). FIG. 29 is a graph showing an envelope of the array factor shown in FIG. 28 (shown by the orthogonal coordinate with a vertical axis representing gain and a horizontal axis representing direction). FIG. 30 is a graph (shown by the orthogonal coordinate with a vertical axis representing half power beam width and a horizontal axis representing peak direction) plotting a half power beam width of the array factor corresponding to each antenna weight vector set constituting the improved optimized beam table OBT'(64°, 124°).

As shown in FIG. 30, the half power beam width of the array factor corresponding to each antenna weight vector set constituting the improved optimized beam table OBT'(64°, 124°) is minimum in the 64° direction and the 124° direction, and gradually increases as a distance from the 64° direction and the 124° direction increases. At this time, the increasing rate of the half power beam width of the array factor gradually increasing as a distance from the 64° direction and the 124° direction increases is larger than that of the optimized beam table OBT (64°, 124°) before the improvement. For this reason, in the direction far from the 64° direction and the 124° direction, the drop in gain in the valley of the array factor is smaller than the drop in gain in the optimized beam table OBT (64°, 124°) before the improvement. Therefore, the decrease in gain that may occur in a direction far from the 64° direction and the 124° direction can be reduced. For example, the gain in the deepest valley of the array factor can be increased from 4.8 dB (before improvement) to 7.7 dB (after improvement).

In the above-described optimized beam tables OBT'(90°), OBT'(107°), OBT'(56°), and OBT'(64°. 124°), regarding the half power beam width of the array factor corresponding to each antenna weight vector set, the maximum half power beam width is set to be a double or more of the minimum half power beam width. As a result, the drop in gain in the valley of the array factor far from the direction to be optimized is reduced to be sufficiently small.

(Second Specific Example of Standard Beam Table)

In the above-described embodiments, as a standard beam table SBT and an optimized beam tables OBT and OBT', the beam table constituted by fifteen antenna weight vector sets is used. However, the number of antenna weight vector sets constituting the standard beam table SBT and the optimized beam tables OBT and OBT' is arbitrary, and is not limited to fifteen. When the standard beam table SBT and the optimized beam tables OBT and OBT' is constituted by a small number of antenna weight vectors, it is advantageous in that the capacity of the storage 151 that stores these beam tables can be reduced. On the other hand, when the standard beam table SBT and the optimized beam tables OBT and OBT' are constituted by a large number of antenna weight vector sets, it is advantageous in that the decrease in gain in the valley of the army factor can be reduced.

As an example of the standard beam table constituted by a large number of antenna weight vector sets, a standard beam table SBT" constituted by sixty-one antenna weight vector sets is considered. Assuming a beamforming antenna 13 including sixteen antenna elements that are equally spaced on the same line in the same plane similar to the standard beam table SBT as described above, as the direction orthogonal to the plane is 90° direction, the standard beam table SBT" is designed such that from the 30° direction to the 150° direction is covered.

Figure 31:
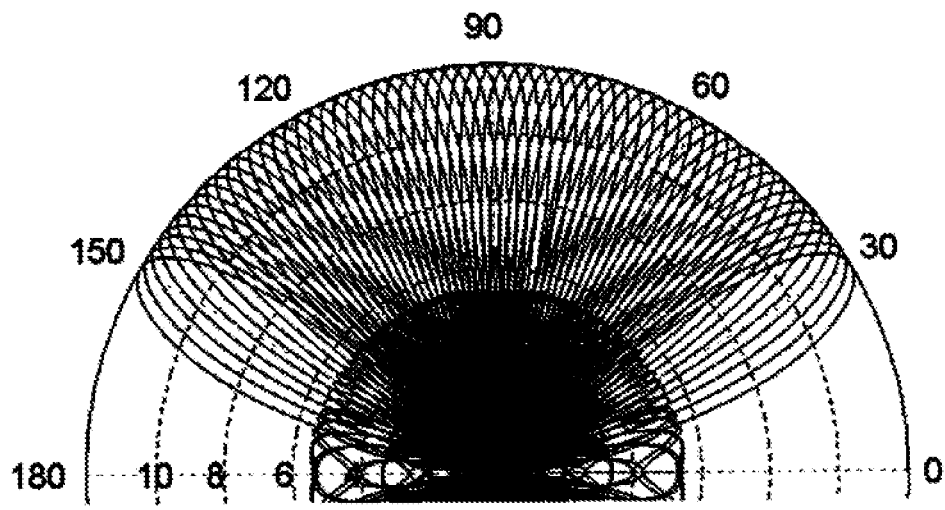
FIG. 31 is a graph regarding a second specific example of the standard beam table (standard beam table SBT") used by the first wireless communication device shown in FIG. 2, and in particular, a graph (shown by the polar coordinate) showing an array factor corresponding to each antenna weight vector set constituting the standard beam table SBT".
Figure 32:
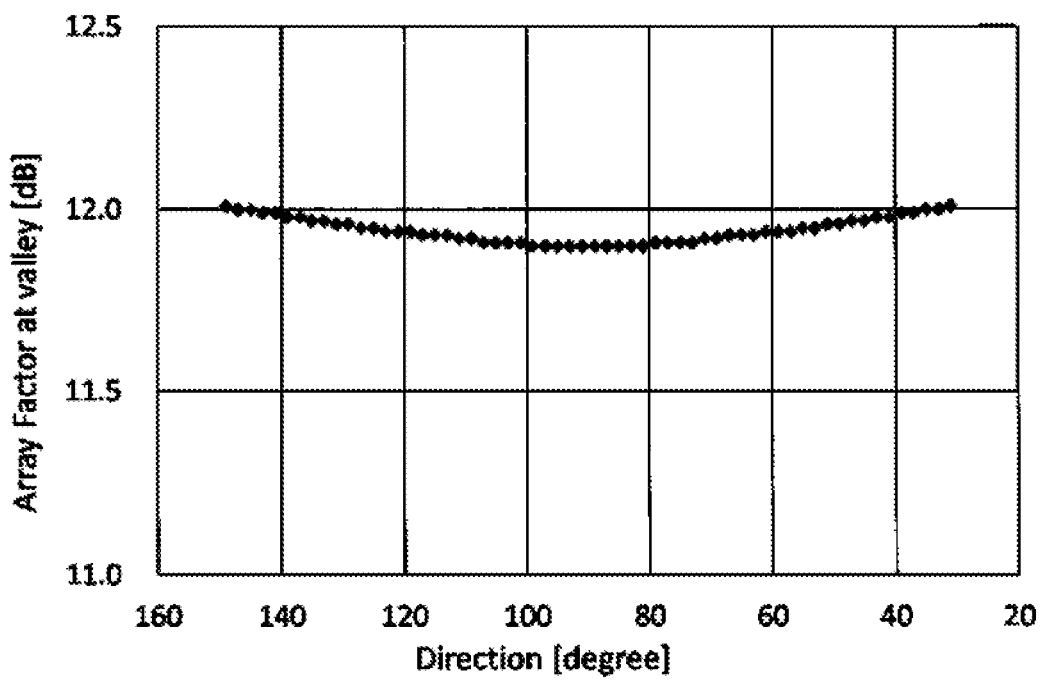
FIG. 32 is a graph regarding a second specific example of the standard beam table (standard beam table SBT") used by the first wireless communication device shown in FIG. 2, and in particular, is a graph (shown by the orthogonal coordinate with a vertical axis representing gain and a horizontal axis representing direction) plotting picked-up valleys of the array factor shown in FIG. 31.
Figure 33:
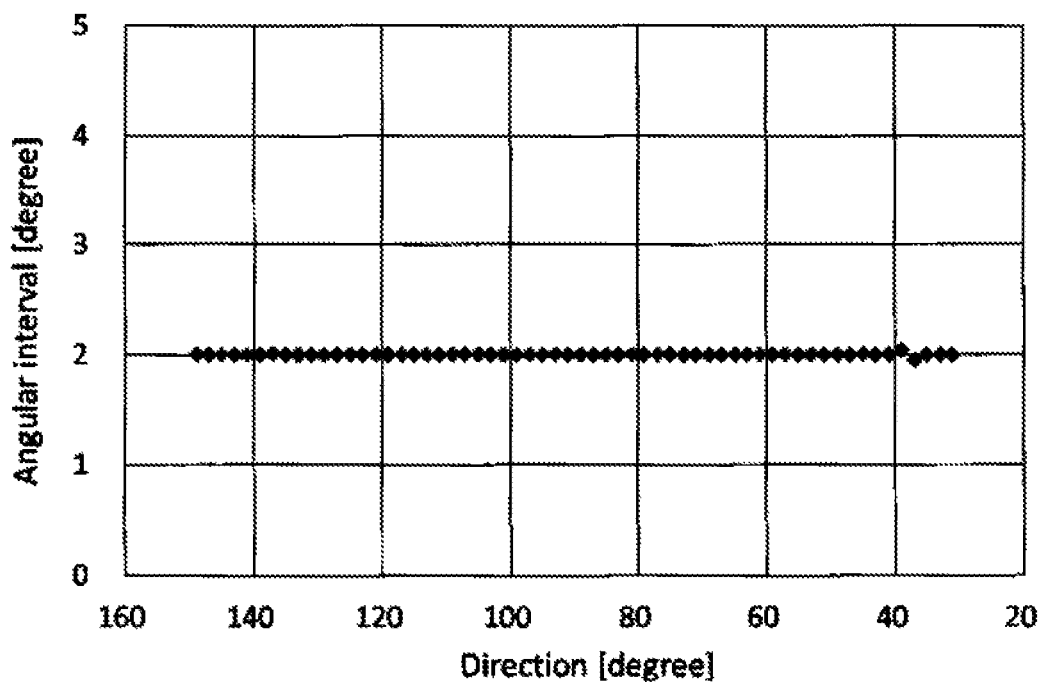
FIG. 33 is a graph regarding a second specific example of the standard beam table (standard beam table SBT") used by the first wireless communication device shown in FIG. 2, and in particular, a graph (shown by the orthogonal coordinate with a vertical axis representing angular interval and a horizontal axis representing the middle direction of two peak directions) plotting an angular interval of peak direction of the array factor corresponding to each antenna weight vector set.
Figure 34:
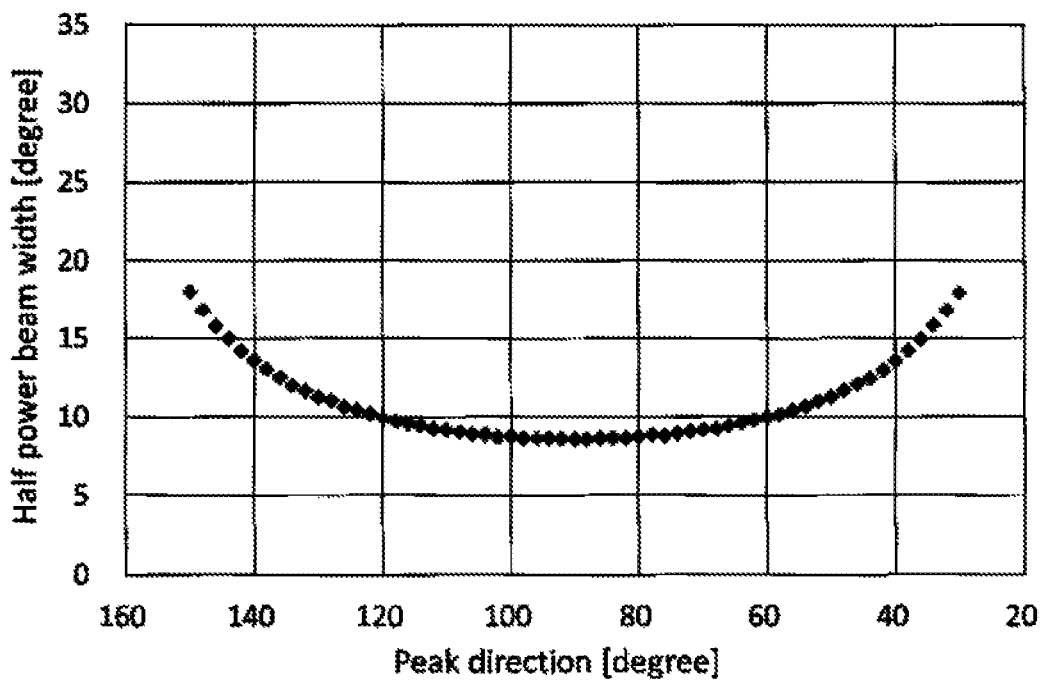
FIG. 34 is a graph regarding a second specific example of the standard beam table (standard beam table SBT") used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the standard beam table SBT".

FIG. 31 is a graph (shown by the polar coordinate) showing an array factor corresponding to each antenna weight vector set constituting the standard beam table SBT" designed as described above. FIG. 32 is a graph (shown by the orthogonal coordinate with a vertical axis representing gain and a horizontal axis representing direction) plotting picked-up valleys of the array factor shown in FIG. 31. FIG. 33 is a graph (shown by the orthogonal coordinate with a vertical axis representing angular interval and a horizontal axis representing the middle direction of two peak directions) plotting an angular interval of peak directions of the array factor corresponding to each antenna weight vector set constituting the standard beam table SBT" designed as described above. FIG. 34 is a graph (shown by the orthogonal coordinate with a vertical axis representing half power beam width and a horizontal axis representing peak direction) plotting a half power beam width of the array factor corresponding to each antenna weight vector set constituting the standard beam table SBT" designed as described above.

According to FIG. 33, it is found that the angular interval of the peak directions of the array factor corresponding to each antenna weight vector set constituting the standard beam table SBT" is approximately 2°, which is smaller than that of the above-described standard beam table SBT.

According to FIG. 32, the drop in gain at the valley of the array factor corresponding to each antenna weight vector constituting the standard beam table SBT" is approximately 0.1 dB, which is smaller than that of the above-described standard beam table SBT. However, there is still a disadvantageous direction, and there is a possibility that a lower-speed MCS may be selected in communication with the second wireless communication device 2 located in such a direction.

(Third Specific Example of Optimized Beam Table Group)

As a third specific example of the optimized beam table group, an optimized beam table group suitable for using with the above-described standard beam table SBT" is considered. The optimized beam table group is constituted by sixty-one optimized beam tables OBT"(30°), OBT"(32°), OBT"(34°), . . . , OBT"(56°), . . . , OBT"(88°), OBT"(90°), OBT"(92°), . . . , OBT"(110°), . . . , OBT"(146°), OBT"(148°), and OBT"(150°). Assuming a beamforming antenna 13 including sixteen antenna elements that are equally spaced on the same line in the same plane, as the direction orthogonal to the plane is 90° direction, each optimized beam table OBT"(θk) is designed such that from the 30° direction to the 150° direction is covered and is constituted by sixty-one antenna weight vector sets. Hereinafter, three optimized beam tables OBT"(90°), OBT"(110°), and OBT"(56°) optimized for the 90° direction, the 110° direction, and the 56° direction will be described as an example.

Figure 35:
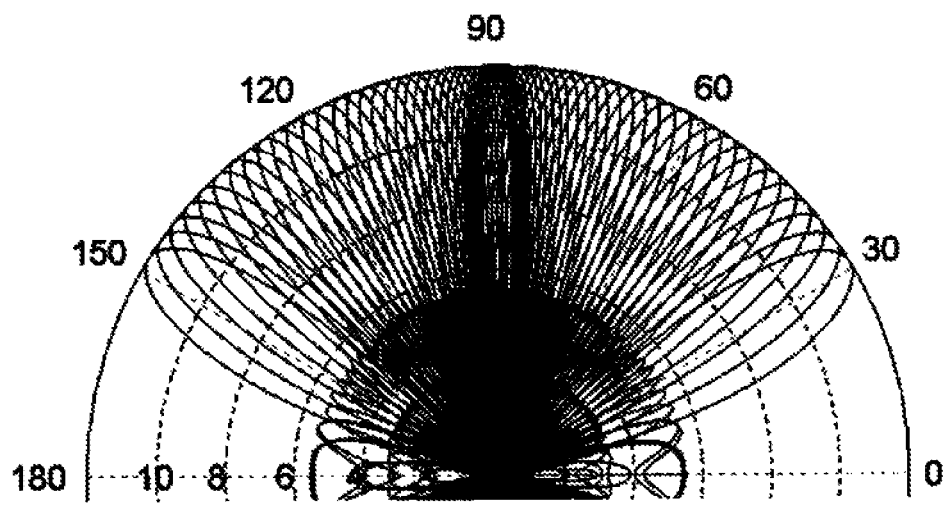
FIG. 35 is a graph regarding a third specific example of an optimized beam table group used by the first wireless communication device shown in FIG. 2, and in particular, a graph (shown by the polar coordinate) showing an army factor corresponding to each antenna weight vector set constituting the optimized beam table OBT"(90°) included in the optimized beam table group.
Figure 36:
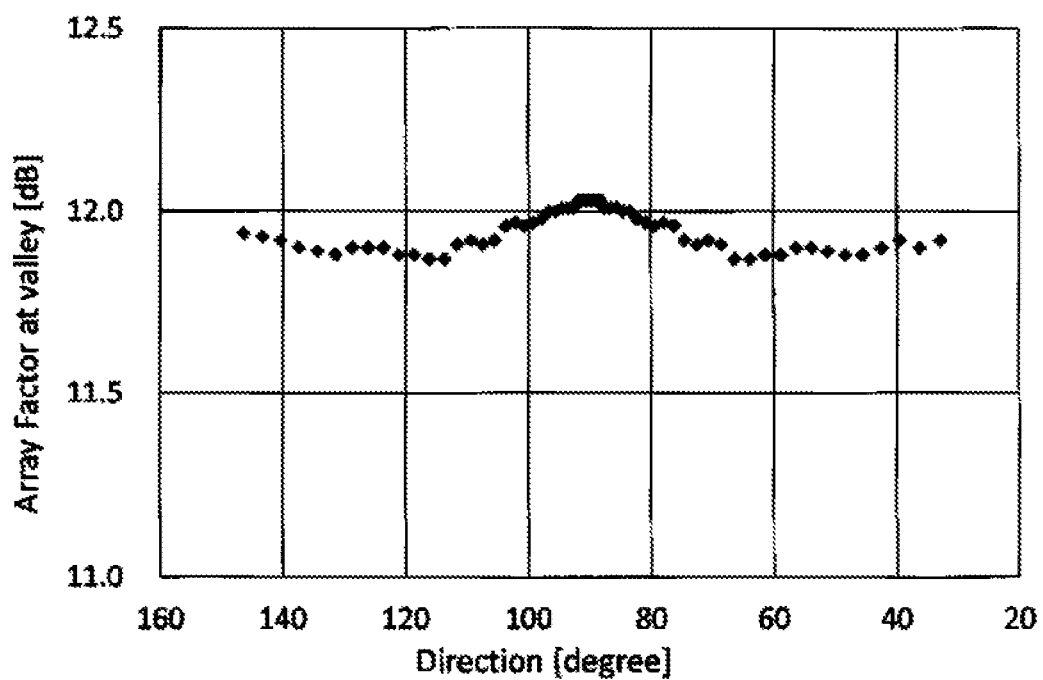
FIG. 36 is a graph regarding a third specific example of an optimized beam table group used by the first wireless communication device shown in FIG. 2, and in particular, a graph (shown by the orthogonal coordinate with a vertical axis representing gain and a horizontal axis representing direction) plotting picked-up valleys of the array factor shown in FIG. 35.
Figure 37:
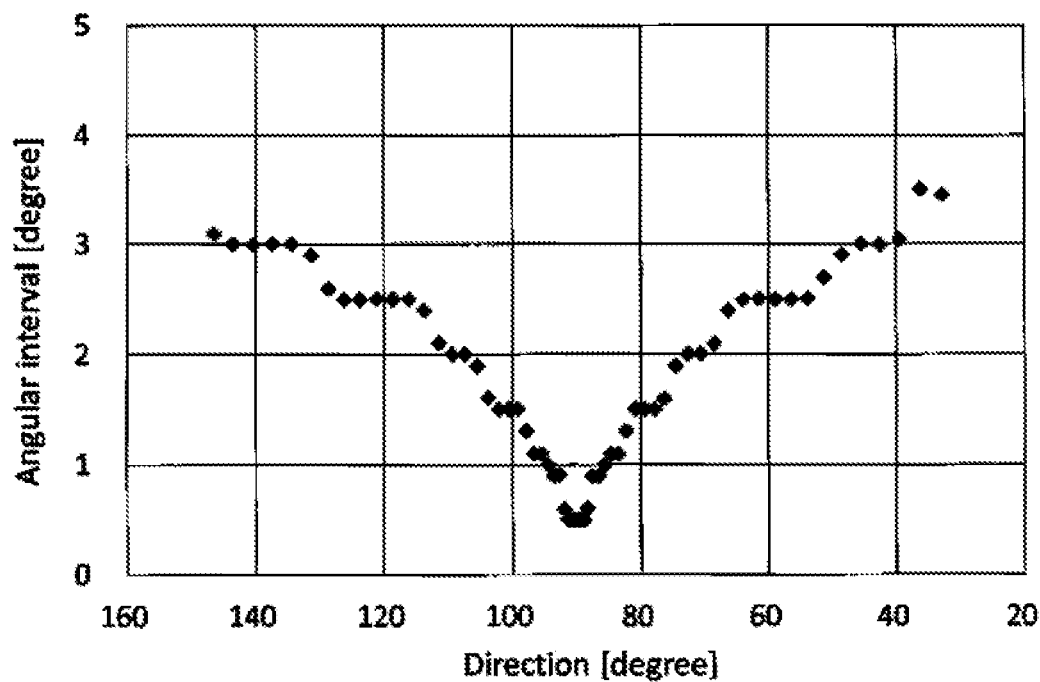
FIG. 37 is a graph regarding a third specific example of an optimized beam table group used by the first wireless communication device shown in FIG. 2, and in particular, a graph (shown by the orthogonal coordinate with a vertical axis representing angular interval and a horizontal axis representing middle direction of two peak directions) plotting an angular interval of peak directions of the array factor corresponding to each antenna weight vector set constituting the optimized beam table OBT"(90°) included in the optimized beam-table group.
Figure 38:
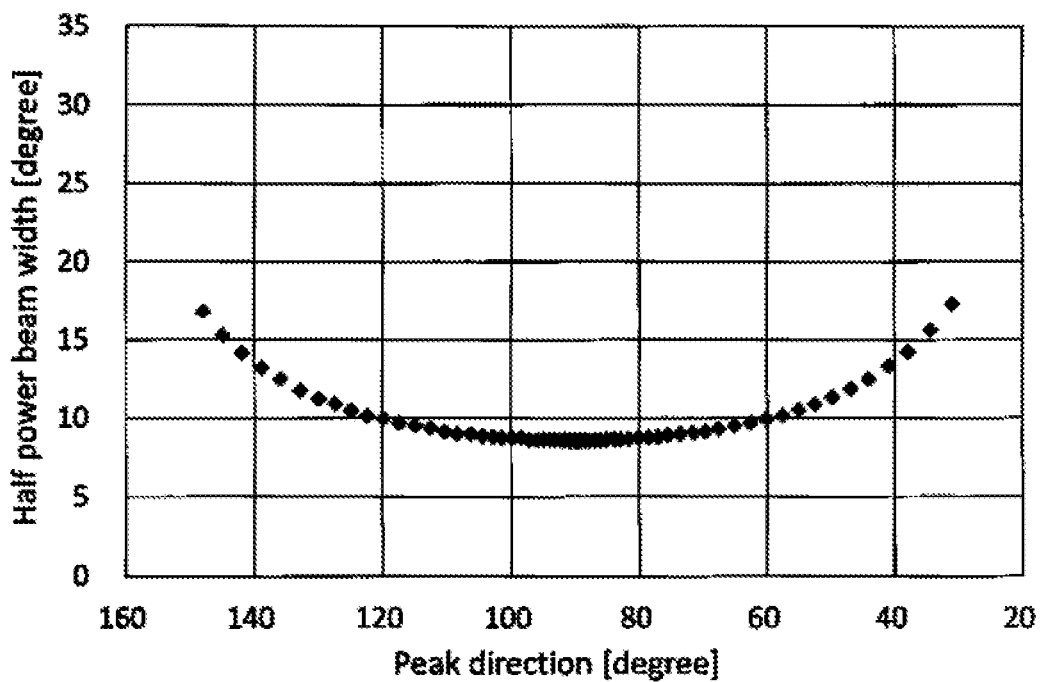
FIG. 38 is a graph regarding a third specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT"(90°) included in the optimized beam table group.

First, the optimized beam table OBT"(90°) will be described with reference to FIGS. 35-38. FIG. 35 is a graph (shown by polar coordinates) showing an array factor corresponding to each antenna weight vector set constituting the optimized beam table OBT"(90°). FIG. 36 is a graph (shown by the orthogonal coordinate with a vertical axis representing gain and a horizontal axis representing direction) plotting picked-up valleys of the array factor shown in FIG. 35. FIG. 37 is a graph (shown by the orthogonal coordinate with a vertical axis representing angular interval and a horizontal axis representing the middle direction of two peak directions) plotting an angular interval of peak directions of the array factor corresponding to each antenna weight vector set constituting the optimized beam table OBT"(90°). FIG. 38 is a graph (shown by the orthogonal coordinate with a vertical axis representing half power beam width and a horizontal axis representing peak direction) plotting a half power beam width of the array factor corresponding to each antenna weight vector set constituting the optimized beam table OBT"(90°).

According to FIG. 36, in the vicinity of the 90° direction, there is almost no drop in gain in the valley of the array factor corresponding to each antenna weight vector set constituting the optimized beam table OBT"(90°). According to FIG. 37, the angular interval of the peak directions of the array factor corresponding to each antenna weight vector set constituting the optimized beam table OBT"(90°) is 0.5° or more and 3.5° or less, which is smaller than that of the optimized beam table OBT (90°) described above.

In addition, according to FIG. 36, the drop in gain at the valley of the array factor corresponding to each antenna weight vector set constituting the optimized beam table OBT"(90°) is at most approximately 0.2 dB, which is smaller than that of the above-described optimized beam table OBT (90°).

Figure 39:
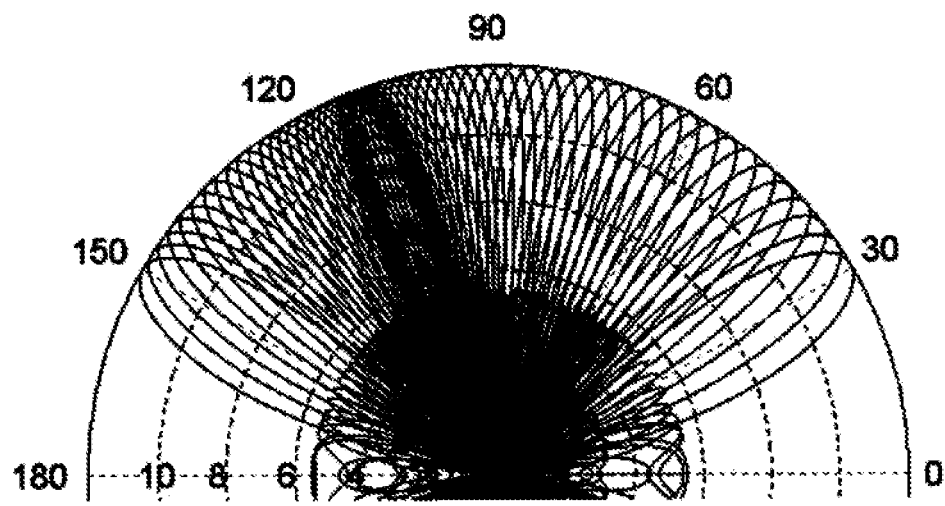
FIG. 39 is a graph regarding a third specific example of an optimized beam table group used by the first wireless communication device shown in FIG. 2, and in particular, a graph (shown by the polar coordinate) showing an array factor corresponding to each antenna weight vector constituting the optimized beam table OBT"(110°) included in the optimized beam table group.
Figure 40:
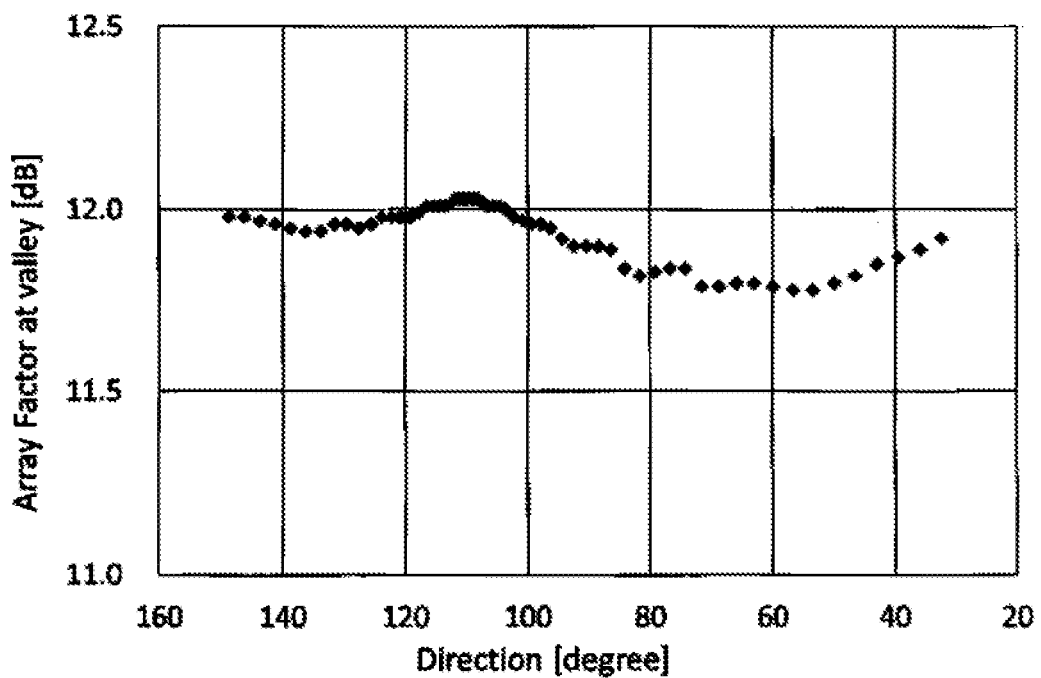
FIG. 40 is a graph regarding a third specific example of an optimized beam table group used by the first wireless communication device shown in FIG. 2, and in particular, a graph (shown by the orthogonal coordinate with a vertical axis representing gain and a horizontal axis representing direction) plotting picked-up valleys of the array factor shown in FIG. 39.
Figure 41:
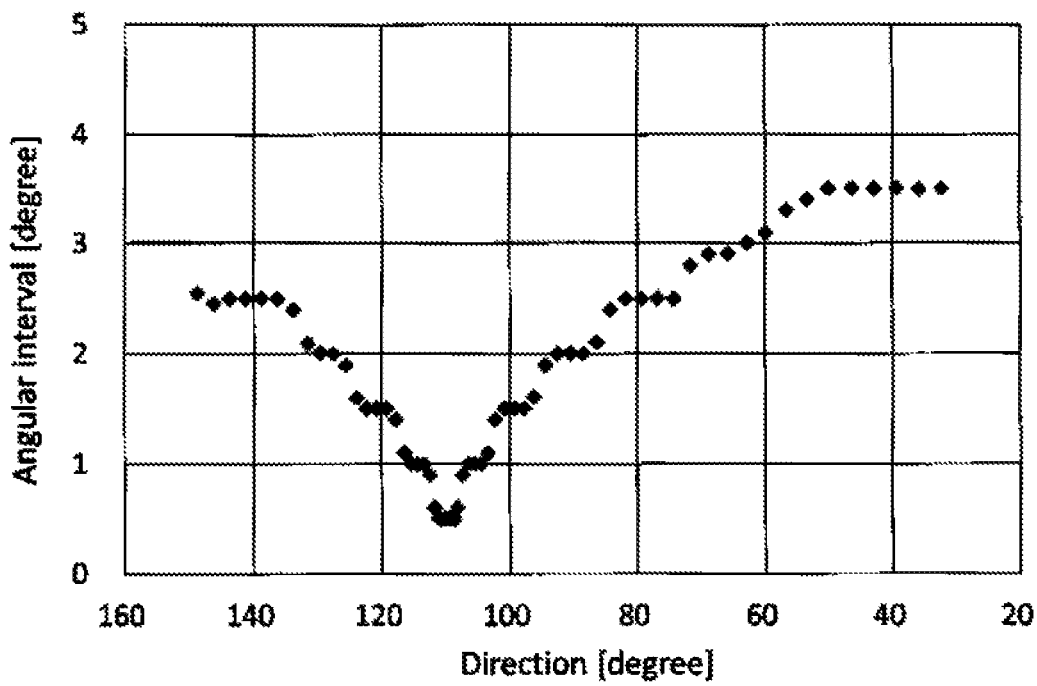
FIG. 41 is a graph regarding a third specific example of an optimized beam table group used by the first wireless communication device shown in FIG. 2, and in particular, a graph (shown by the orthogonal coordinate with a vertical axis representing angular interval and a horizontal axis representing middle direction of two peak directions) plotting an angular interval of peak directions of the array factor corresponding to each antenna weight vector set constituting the optimized beam table OBT"(110°) included in the optimized beam-table group.
Figure 42:
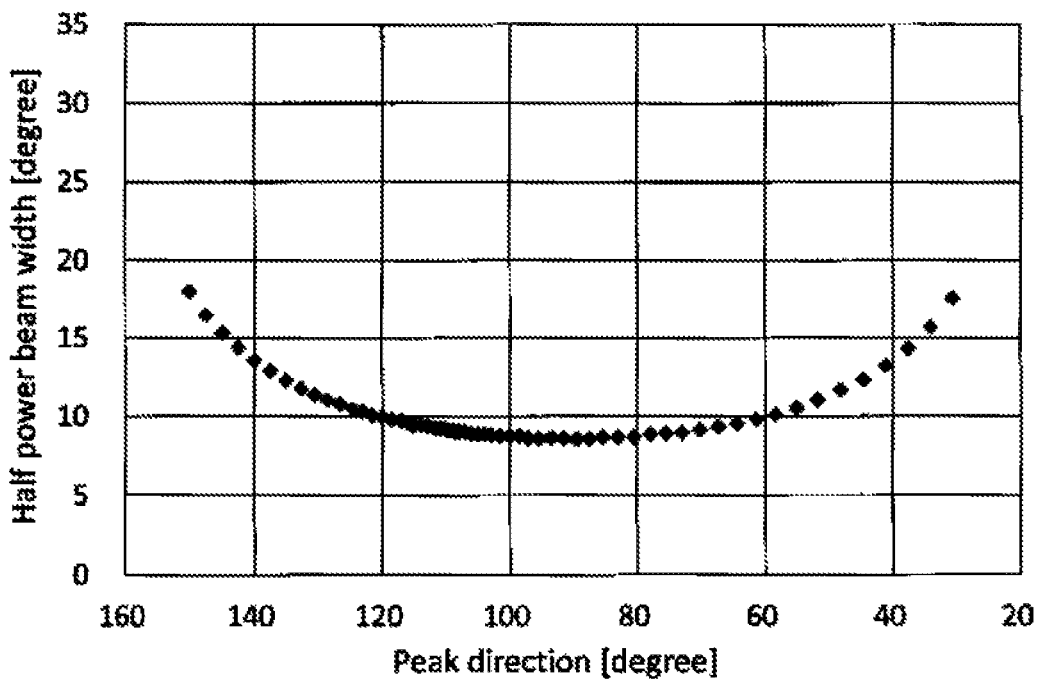
FIG. 42 is a graph regarding a third specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT"(110°) included in the optimized beam table group.

Next, the optimized beam table OBT"(110°) will be described with reference to FIGS. 39-42. FIG. 39 is a graph (shown by polar coordinates) showing an array factor corresponding to each antenna weight vector set constituting the optimized beam table OBT"(110°). FIG. 40 is a graph (shown by the orthogonal coordinate with a vertical axis representing gain and a horizontal axis representing direction) plotting picked-up valleys of the array factor shown in FIG. 39. FIG. 41 is a graph (shown by the orthogonal coordinate with a vertical axis representing angular interval and a horizontal axis representing the middle direction of two peak directions) plotting an angular interval of peak directions of the array factor corresponding to each antenna weight vector set constituting the optimized beam table OBT"(110°). FIG. 42 is a graph (shown by the orthogonal coordinate with a vertical axis representing half power beam width and a horizontal axis representing peak direction) plotting a half power beam width of the array factor corresponding to each antenna weight vector set constituting the optimized beam table OBT"(110°).

According to FIG. 40, in the vicinity of the 110° direction, there is almost no drop in gain in the valley of the array factor corresponding to each antenna weight vector set constituting the optimized beam table OBT"(110°). According to FIG. 41, the angular interval of the peak directions of the array factor corresponding to each antenna weight vector set constituting the optimized beam table OBT"(110°) is 0.5° or more and 3.5° or less, which is smaller than that of the optimized beam table OBT (107°) described above.

In addition, according to FIG. 40, the drop in gain at the valley of the array factor corresponding to each antenna weight vector set constituting the optimized beam table OBT"(110°) is at most approximately 0.4 dB, which is smaller than that of the above-described optimized beam table OBT (107°).

Figure 43:
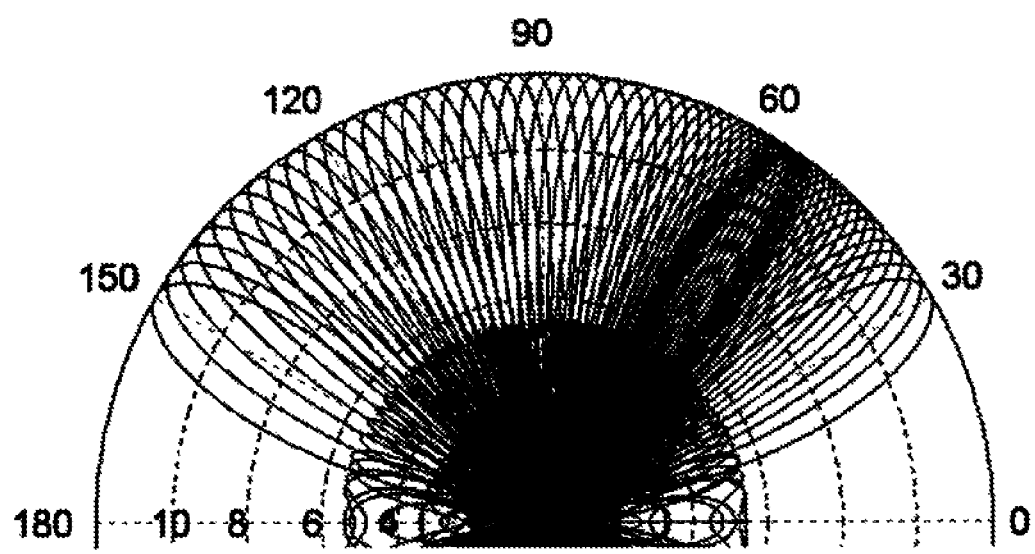
FIG. 43 is a graph regarding a third specific example of an optimized beam table group used by the first wireless communication device shown in FIG. 2, and in particular, a graph (shown by the polar coordinate) showing an array factor corresponding to each antenna weight vector set constituting the optimized beam table OBT'(56°) included in the optimized beam table group.
Figure 44:
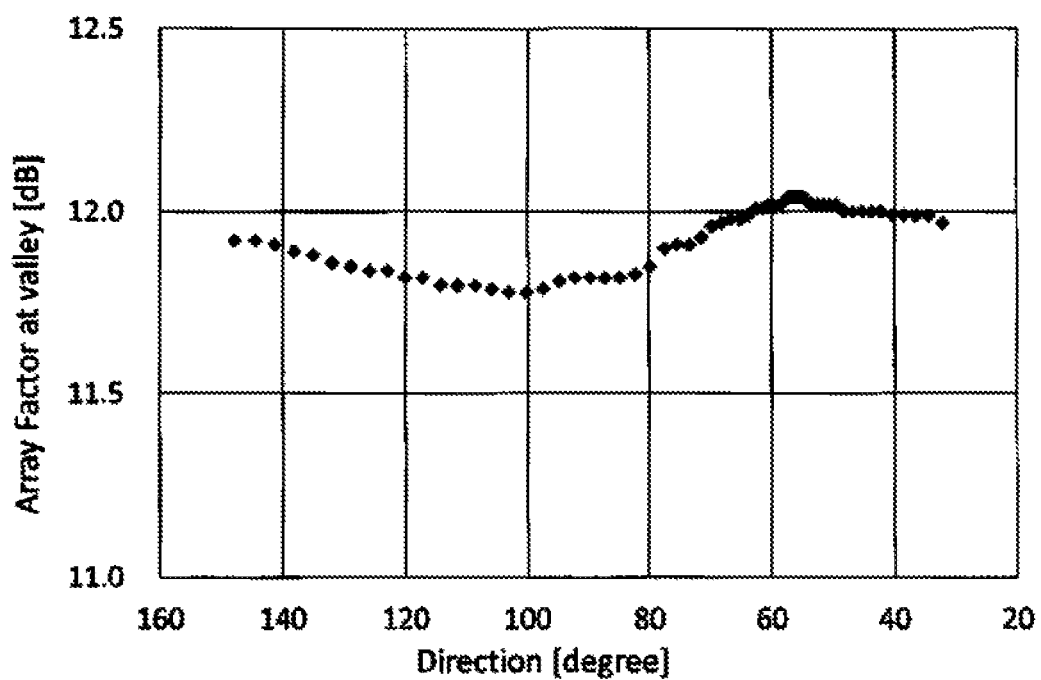
FIG. 44 is a graph regarding a third specific example of an optimized beam table group used by the first wireless communication device shown in FIG. 2, and in particular, a graph (shown by the orthogonal coordinate with a vertical axis representing gain and a horizontal axis representing direction) plotting picked-up valleys of the array factor shown in FIG. 43.
Figure 45:
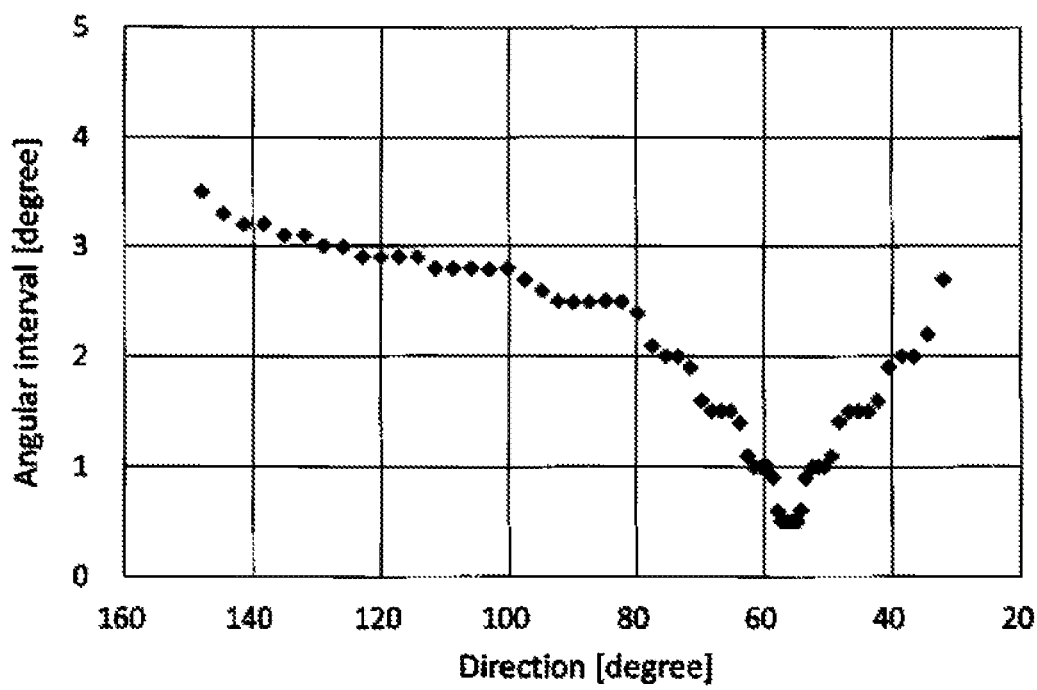
FIG. 45 is a graph regarding a third specific example of an optimized beam table group used by the first wireless communication device shown in FIG. 2, and in particular, a graph (shown by the orthogonal coordinate with a vertical axis representing angular interval and a horizontal axis representing middle direction of two peak directions) plotting an angular interval of peak directions of the array factor corresponding to each antenna weight vector set constituting the optimized beam table OBT"(56°) included in the optimized beam table group.
Figure 46:
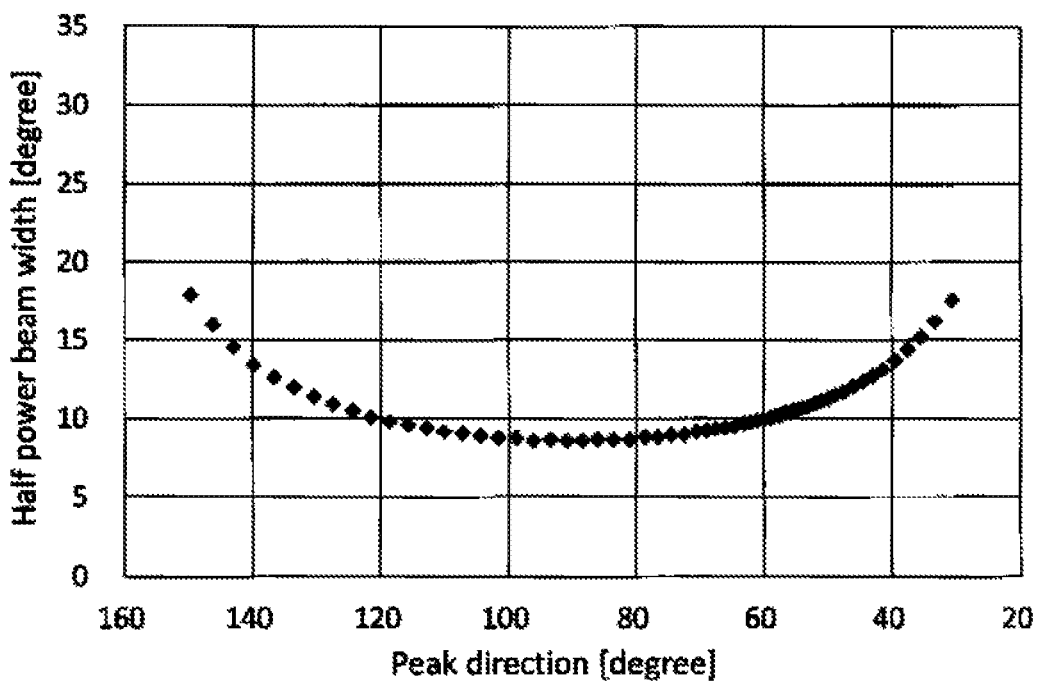
FIG. 46 is a graph regarding a third specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT"(56°) included in the optimized beam table group.

Finally, the optimized beam table OBT"(56°) will be described with reference to FIGS. 43-46. FIG. 43 is a graph (shown by polar coordinates) showing an array factor corresponding to each antenna weight vector set constituting the optimized beam table OBT"(56°). FIG. 44 is a graph (shown by the orthogonal coordinate with a vertical axis representing gain and a horizontal axis representing direction) plotting picked-up valleys of the array factor shown in FIG. 43. FIG. 45 is a graph (shown by the orthogonal coordinate with a vertical axis representing angular interval and a horizontal axis representing the middle direction of two peak directions) plotting an angular interval of peak directions of the array factor corresponding to each antenna weight vector set constituting the optimized beam table OBT"(56°). FIG. 46 is a graph (shown by the orthogonal coordinate with a vertical axis representing half power beam width and a horizontal axis representing peak direction) plotting a half power beam width of the array factor corresponding to each antenna weight vector constituting the optimized beam table OBT"(56°).

According to FIG. 44, in the vicinity of the 56° direction, there is almost no drop in gain in the valley of the array factor corresponding to each antenna weight vector set constituting the optimized beam table OBT"(56°). According to FIG. 45, the angular interval in the peak direction of the array factor corresponding to each antenna weight vector set constituting the optimized beam table OBT"(56°) is 0.5° or more and 3.5° or less, which is smaller than that of the optimized beam table OBT (56°) described above.

In addition, according to FIG. 44, the drop in gain at the valley of the array factor corresponding to each antenna weight vector set constituting the optimized beam table OBT"(56°) is at most approximately 0.4 dB, which is smaller than that of the above-described optimized beam table OBT (56°).

The optimized beam table group according to the present specific example may include an optimized beam table optimized in two or more directions. For example, assuming that the number of directions to be optimized is N, the number of the optimized beam tables is $_NC_2$ for the tables optimized with respect to two directions, and the number of the optimized beam table is $_NC_3$ for the table optimized with respect to three directions. As an example of such an optimized beam table, art optimized beam table OBT"(64°, 124°) constituted by sixty-one antenna weight vector sets is considered. Assuming a beamforming antenna 13 including sixteen antenna elements that are equally spaced on the same line in the same plane similar to the optimized beam table OBT (64°, 124°) as described above, as the direction orthogonal to the plane is 90° direction, the optimized beam table OBT"(64°, 124°) is designed such that from the 30° direction to the 150° direction is covered and is optimized in the 64° direction and the 124° direction.

Figure 47:
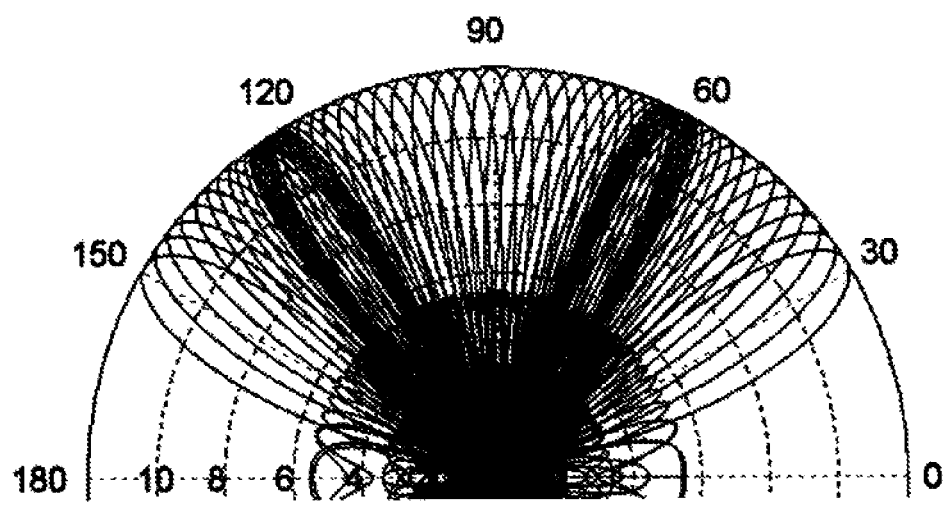
FIG. 47 is a graph regarding a third specific example of an optimized beam table group used by the first wireless communication device shown in FIG. 2, and in particular, a graph (shown by the polar coordinate) showing an array factor corresponding to each antenna weight vector ser constituting the optimized beam table OBT"(64°, 124°) included in the optimized beam table group.
Figure 48:
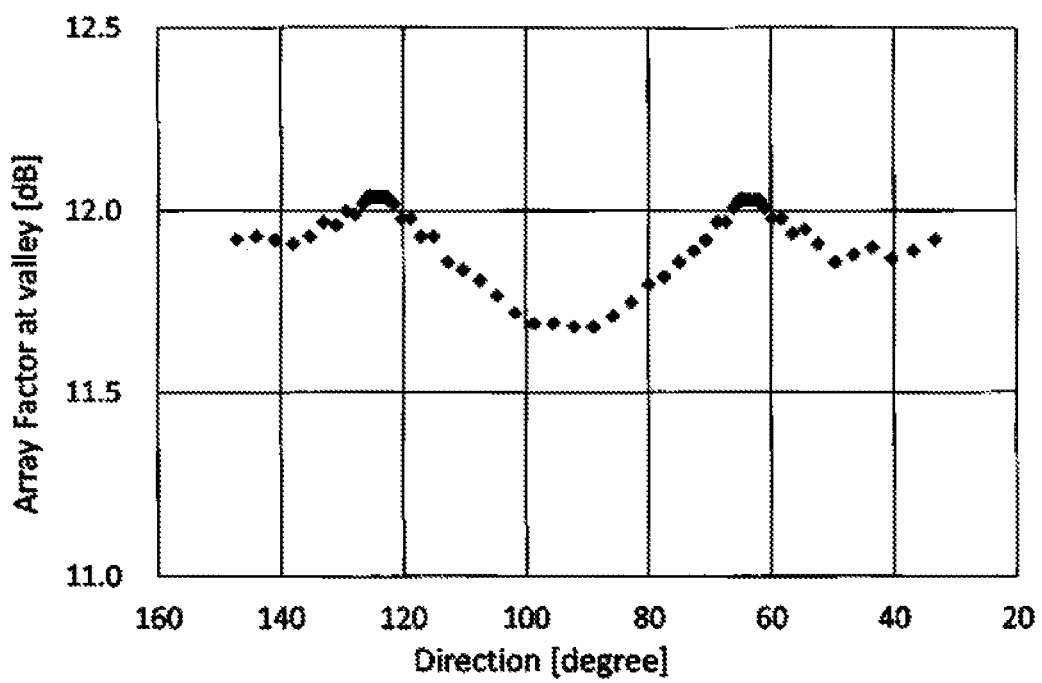
FIG. 48 is a graph regarding a third specific example of an optimized beam table group used by the first wireless communication device shown in FIG. 2, and in particular, a graph (shown by the orthogonal coordinate with a vertical axis representing gain and a horizontal axis representing direction) plotting picked-up valleys of the array factor shown in FIG. 47.
Figure 49:
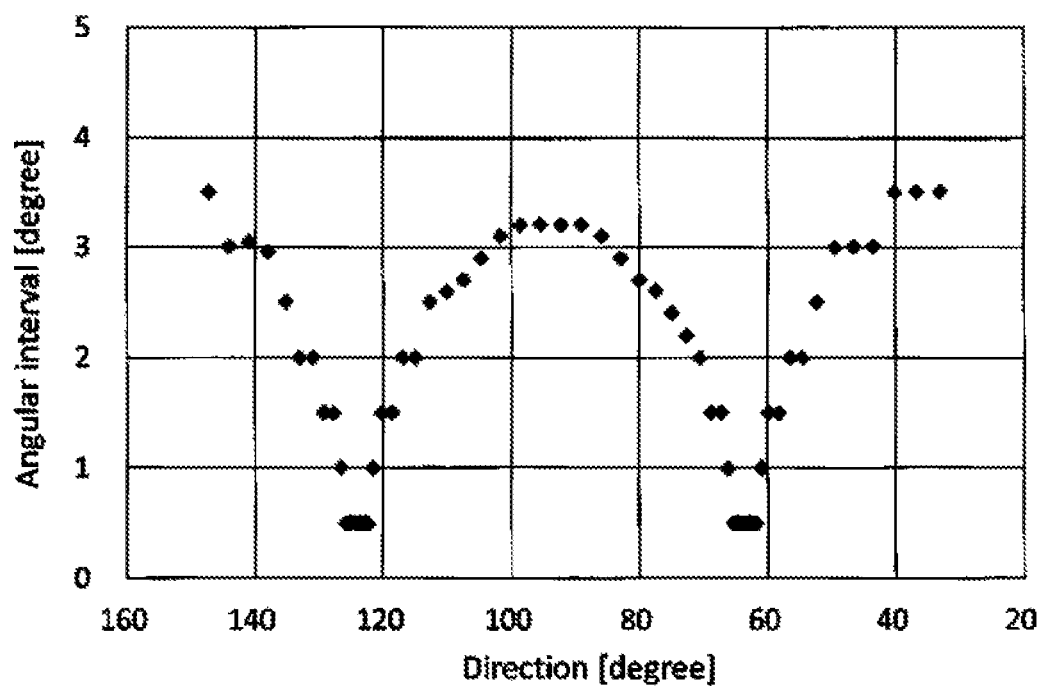
FIG. 49 is a graph regarding a third specific example of an optimized beam table group used by the first wireless communication device shown in FIG. 2, and in particular, a graph (shown by the orthogonal coordinate with a vertical axis representing angular interval and a horizontal axis representing middle direction of two peak directions) plotting an angular interval of peak directions of the array factor corresponding to each antenna weight vector set constituting the optimized beam table OBT"(64°, 124°) included in the optimized beam-table group.
Figure 50:
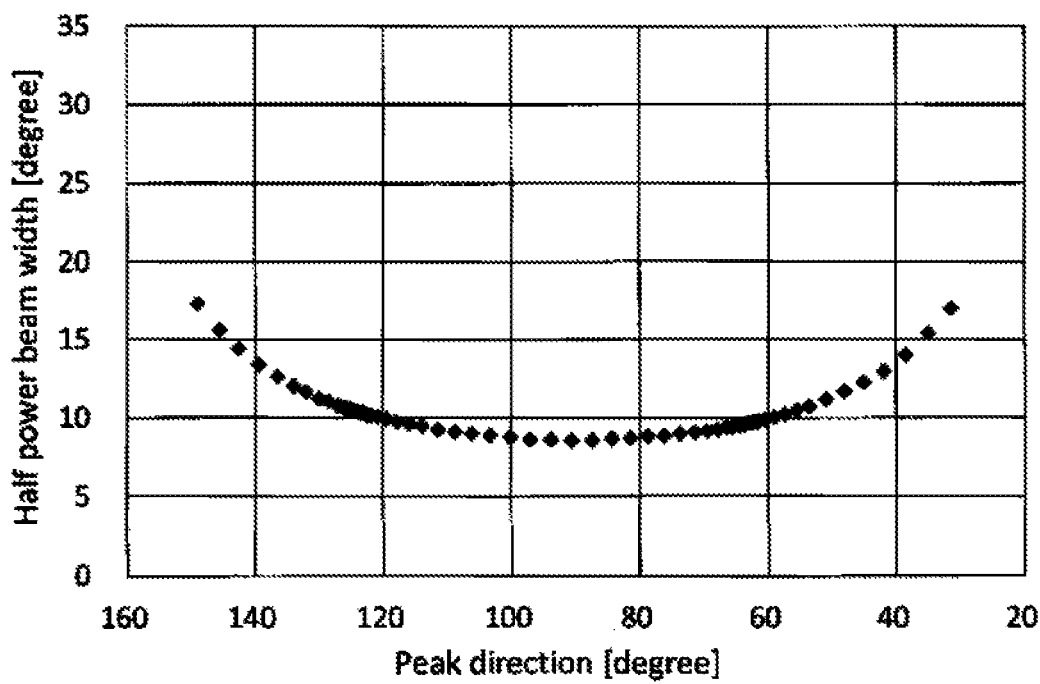
FIG. 50 is a graph regarding a third specific example of an optimized beam table group used by the first wireless communication device shown in FIG. 2, and in particular, a graph (shown by the orthogonal coordinate with a vertical axis representing half power beam width and a horizontal axis representing peak direction) plotting a half power beam width of the array factor corresponding to each antenna weight vector set constituting the optimized beam table OBT"(64°, 124°) included in the optimized beam table group.
Figure 51:
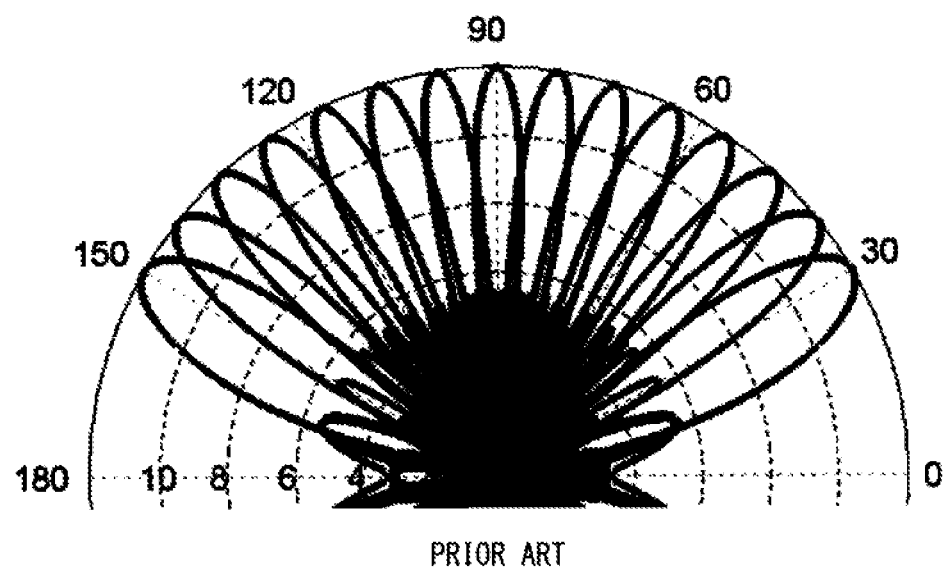
FIG. 51 is a graph (shown by the polar coordinate) showing an array factor corresponding to each antenna weight vector set constituting the standard beam table used by the conventional wireless communication device.
Figure 52:
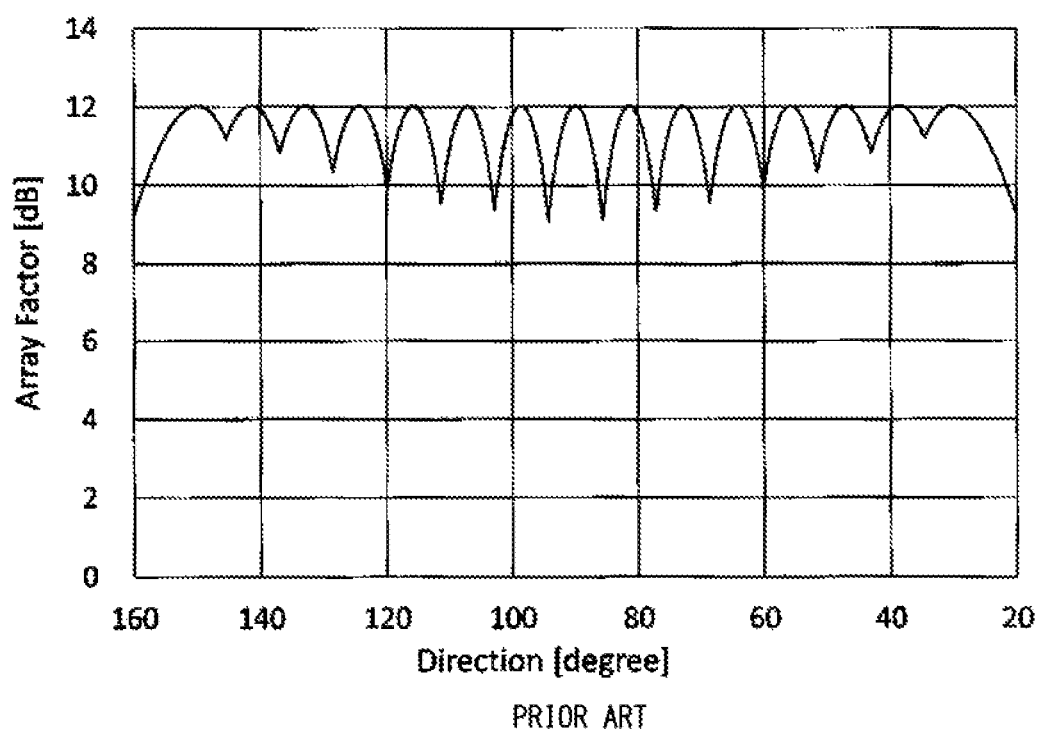
FIG. 52 is a graph (shown by the orthogonal coordinate with a vertical axis representing gain and a horizontal axis representing direction) showing an envelope of the array factor shown in FIG. 51.
Figure 53:
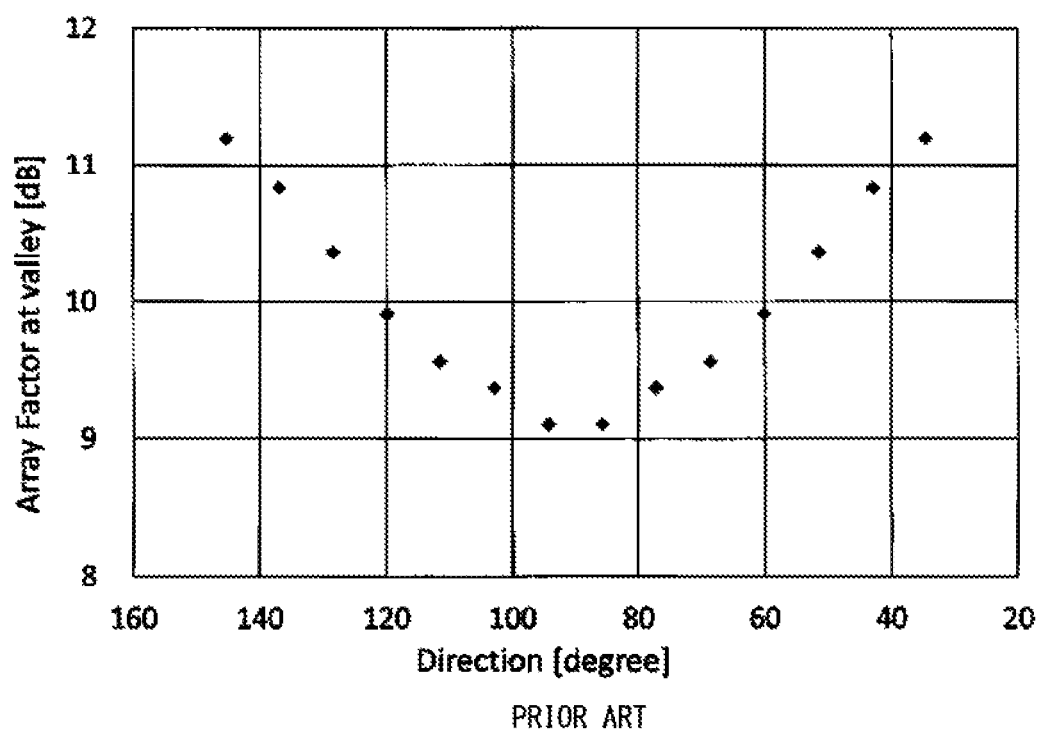
FIG. 53 is a graph (shown by the orthogonal coordinate with a vertical axis representing gain and a horizontal axis representing direction) plotting picked-up valleys of the array factor shown in FIG. 51 (minimum points of the envelope shown in FIG. 52).

FIG. 47 is a graph (shown by the polar coordinate) showing an array factor corresponding to each antenna weight vector let constituting the optimized beam table OBT"(64°, 124°) designed as described above. FIG. 48 is a graph (shown by the orthogonal coordinate with a vertical axis representing gain and a horizontal axis representing direction) plotting picked-up valleys of the array factor shown in FIG. 47. FIG. 49 is a graph (shown by the orthogonal coordinate with a vertical axis representing angular interval and a horizontal axis representing the middle direction of two peak directions) plotting an angular interval of peak directions of the array factor corresponding to each antenna weight vector set constituting the optimized beam table OBT"(64°, 124°) designed as described above. FIG. 50 is a graph (shown by the orthogonal coordinate with a vertical axis representing half power beam width and a horizontal axis representing peak direction) plotting a half power beam width of the array factor corresponding to each antenna weight vector set constituting the optimized beam table OBT"(64°, 124°) designed as described above.

According to FIG. 48, in the vicinity of the 64° direction and the 124° direction, there is almost no drop in gain in the valley of the array factor corresponding to each antenna weight vector set constituting the optimized beam table OBT"(64°, 124°). According to FIG. 49, the angular interval of the peak directions of the array factor corresponding to each antenna weight vector set constituting the optimized beam table OBT"(64°, 124°) is 0.5° or more and 3.5° or less, which is smaller than that of the optimized beam table OBT (64°, 124°) described above.

In addition, according to FIG. 48, the drop in gain at the valley of the array factor corresponding to each antenna weight vector set constituting the optimized beam table OBT"(64°, 124°) is at most approximately 0.4 dB, which is smaller than that of the optimized beam table OBT (64°, 124°) described above.

The wireless communication device according to the first aspect of the present invention includes a beamforming antenna, a storage that stores a plurality of optimized beam tables in which a peak direction of an array factor corresponding to each antenna weight vector set are non-uniformly distributed in an angular space, the respective plurality of optimized beam tables is optimized in different directions, and a beamformer that sets a beam pattern of the beamforming antenna based on an antenna weight vector set constituting one optimized beam table selected from the plurality of optimized beam tables.

In the wireless communication device according to the second aspect of the present invention, in addition to the configuration of the wireless communication device according to the first aspect of the present invention, a configuration may be employed such that the storage further stores a standard beam table in which a peak direction of an array factor corresponding to each antenna weight vector set is uniformly distributed in the angular space, and the one optimized beam table selected is an optimized beam table optimized in a direction closest to a direction specified using the standard beam table and in which an opposite communication device exists.

In the wireless communication device according to the third aspect of the present invention, in addition to the configuration of the wireless communication device according to the first aspect of the present invention, a configuration may be employed such that regarding a peak direction of an array factor corresponding to each antenna weight vector set constituting the optimized beam table, a difference between two peak directions adjacent to each other in the angular space is minimum in an optimized direction.

In the wireless communication device according to the fourth aspect of the present invention, in addition to the configuration of the wireless communication device according to the third aspect of the present invention, a configuration may be employed such that regarding a peak direction of an array factor corresponding to each antenna weight vector set constituting the optimized beam table, a difference between two peak directions adjacent to each other in the angular space increases gradually as a distance from an optimized direction increases.

In the wireless communication device according to the fifth aspect of the present invention, in addition to the configuration of the wireless communication device according to the fourth aspect of the present invention, a configuration may be employed such that regarding a peak direction of an array factor corresponding to each antenna weight vector set constituting the optimized beam table, a maximum value of a difference between two peak directions adjacent to each other in the angular space is a double or more of a minimum value of a difference between two peak directions adjacent to each other in the angular space.

In the wireless communication device according to the sixth aspect of the present invention, in addition to the configuration of the wireless communication device according to the first aspect of the present invention, a configuration may be employed such that the plurality of optimized beam tables comprises an optimized beam table optimized in two or more directions.

In the wireless communication device according to the seventh aspect of the present invention, in addition to the configuration of the wireless communication device according to the first aspect of the present invention, a configuration may be employed such that a half power beam width of an array factor corresponding to each antenna weight vector set constituting the optimized beam table is minimum in an optimized direction.

In the wireless communication device according to the eighth aspect of the present invention, in addition to the configuration of the wireless communication device according to the seventh aspect of the present invention, a configuration may be employed such that a half power beam width of an array factor corresponding to each antenna weight vector set constituting the optimized beam table increases gradually as a distance from an optimized direction increases.

In the wireless communication device according to the ninth aspect of the present invention, in addition to the configuration of the wireless communication device according to the eighth aspect of the present invention, a configuration may be employed such that in a half power beam width of an array factor corresponding to each antenna weight vector set constituting the optimized beam table, a maximum half power beam width is a double or more of a minimum half power beam width.

In the wireless communication device according to the tenth aspect of the present invention, in addition to the configuration of the wireless communication device according to the second aspect of the present invention, a configuration may be employed such that a direction specified using the standard beam table is stored in the storage or a nonvolatile storage medium different from the storage.

In the wireless communication device according to the eleventh aspect of the present invention, in addition to the configuration of the wireless communication device according to the tenth aspect of the present invention, a configuration may be employed such that an identifier of an opposite communication device is stored in the storage or the non-volatile storage medium different from the storage in association with the direction specified using the standard beam table.

In the wireless communication device according to the twelfth aspect of the present invention, in addition to the configuration of the wireless communication device according to the second aspect of the present invention, a configuration may be employed such that a direction specified using the standard beam table is transmitted to a server to be stored in the server.

In the wireless communication device according to the thirteenth aspect of the present invention, in addition to the configuration of the wireless communication device according to the twelfth aspect of the present invention, a configuration may be employed such that an identifier of the opposite communication device is transmitted to the server to be stored in the server in association with the direction specified using the standard beam table.

The present invention is not limited to the above-described embodiments, and various modifications can be made within the scope shown in the claims, and embodiments obtained by appropriately combining technical means disclosed in different embodiments are also included in the technical scope of the present invention.

What is claimed is:

1. A wireless communication device comprising:
   a beamforming antenna;
   a storage that stores a plurality of optimized beam tables in which a peak direction of an array factor corresponding to each antenna weight vector are non-uniformly distributed in an angular space, the respective plurality of optimized beam tables is optimized in different directions; and
   a beamformer that sets a beam pattern of the beamforming antenna based on an antenna weight vector constituting one optimized beam table selected from the plurality of optimized beam tables,
   wherein regarding a peak direction of an array factor corresponding to each antenna weight vector constituting the optimized beam table, a difference between two peak directions adjacent to each other in the angular space is minimum in an optimized direction.

2. The wireless communication device according to claim 1, wherein:
   the storage further stores a standard beam table in which a peak direction of an array factor corresponding to each antenna weight vector is uniformly distributed in the angular space; and
   the one optimized beam table selected is an optimized beam table optimized in a direction closest to a direction specified using the standard beam table and in which an opposite communication device exists.

3. The wireless communication device according to claim 1, wherein
regarding a peak direction of an array factor corresponding to each antenna weight vector constituting the optimized beam table, a difference between two peak directions adjacent to each other in the angular space increases gradually as a distance from an optimized direction increases.

4. The wireless communication device according to claim 3, wherein
regarding a peak direction of an array factor corresponding to each antenna weight vector constituting the optimized beam table, a maximum value of a difference between two peak directions adjacent to each other in the angular space is a double or more of a minimum value of a difference between two peak directions adjacent to each other in the angular space.

5. The wireless communication device according to claim 1, wherein the plurality of optimized beam tables comprises an optimized beam table optimized in two or more directions.

6. The wireless communication device according to claim 1, wherein a half power beam width of an array factor corresponding to each antenna weight vector constituting the optimized beam table is minimum in an optimized direction.

7. The wireless communication device according to claim 6, wherein a half power beam width of an array factor corresponding to each antenna weight vector constituting the optimized beam table increases gradually as a distance from an optimized direction increases.

8. The wireless communication device according to claim 7, wherein in a half power beam width of an array factor corresponding to each antenna weight vector constituting the optimized beam table, a maximum half power beam width is a double or more of a minimum half power beam width.

9. The wireless communication device according to claim 2, wherein a direction specified using the standard beam table is stored in the storage or a non-volatile storage medium different from the storage.

10. The wireless communication device according to claim 9, wherein an identifier of the opposite communication device is stored in the storage or the non-volatile storage medium different from the storage in association with the direction specified using the standard beam table.

11. The wireless communication device according to claim 2, wherein a direction specified using the standard beam table is transmitted to a server to be stored in the server.

12. The wireless communication device according to claim 11, wherein an identifier of the opposite communication device is transmitted to the server to be stored in the server in association with the direction specified using the standard beam table.

13. A wireless communication device comprising:
a beamforming antenna;
a storage that stores a plurality of optimized beam tables in which a peak direction of an array factor corresponding to each antenna weight vector are non-uniformly distributed in an angular space, the respective plurality of optimized beam tables is optimized in different directions; and
a beamformer that sets a beam pattern of the beamforming antenna based on an antenna weight vector constituting one optimized beam table selected from the plurality of optimized beam tables,
wherein a half power beam width of an array factor corresponding to each antenna weight vector constituting the optimized beam table is minimum in an optimized direction.

14. The wireless communication device according to claim 13, wherein:
the storage further stores a standard beam table in which a peak direction of an array factor corresponding to each antenna weight vector is uniformly distributed in the angular space; and
the one optimized beam table selected is an optimized beam table optimized in a direction closest to a direction specified using the standard beam table and in which an opposite communication device exists,
wherein a direction specified using the standard beam table is stored in the storage or a non-volatile storage medium different from the storage, and
wherein an identifier of the opposite communication device is stored in the storage or the non-volatile storage medium different from the storage in association with the direction specified using the standard beam table.

15. The wireless communication device according to claim 13, wherein:
the storage further stores a standard beam table in which a peak direction of an array factor corresponding to each antenna weight vector is uniformly distributed in the angular space; and
the one optimized beam table selected is an optimized beam table optimized in a direction closest to a direction specified using the standard beam table and in which an opposite communication device exists,
wherein a direction specified using the standard beam table is transmitted to a server to be stored in the server, and
wherein an identifier of the opposite communication device is transmitted to the server to be stored in the server in association with the direction specified using the standard beam table.

16. The wireless communication device according to claim 13, wherein
regarding a peak direction of an array factor corresponding to each antenna weight vector constituting the optimized beam table, a difference between two peak directions adjacent to each other in the angular space is minimum in an optimized direction, and
wherein regarding a peak direction of an array factor corresponding to each antenna weight vector constituting the optimized beam table, a difference between two peak directions adjacent to each other in the angular space increases gradually as a distance from an optimized direction increases.

17. The wireless communication device according to claim 16, wherein
regarding a peak direction of an array factor corresponding to each antenna weight vector constituting the optimized beam table, a maximum value of a difference between two peak directions adjacent to each other in the angular space is a double or more of a minimum value of a difference between two peak directions adjacent to each other in the angular space.

18. The wireless communication device according to claim 13, wherein the plurality of optimized beam tables comprises an optimized beam table optimized in two or more directions.

19. The wireless communication device according to claim 13, wherein a half power beam width of an array factor corresponding to each antenna weight vector constituting the optimized beam table increases gradually as a distance from an optimized direction increases.

20. The wireless communication device according to claim 19, wherein in a half power beam width of an array factor corresponding to each antenna weight vector constituting the optimized beam table, a maximum half power beam width is a double or more of a minimum half power beam width.

* * * * *